US009140307B2

(12) United States Patent
Schröder et al.

(10) Patent No.: US 9,140,307 B2
(45) Date of Patent: Sep. 22, 2015

(54) CLUTCH ARRANGEMENT AND SEALING ELEMENT

(71) Applicants: Arthur Schröder, Dittelbrunn (DE); Jörg Sudau, Niederwern (DE); Daniel Pittner, Gerbrunn (DE); Axel Rohm, Schonungen (DE)

(72) Inventors: Arthur Schröder, Dittelbrunn (DE); Jörg Sudau, Niederwern (DE); Daniel Pittner, Gerbrunn (DE); Axel Rohm, Schonungen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/375,375

(22) PCT Filed: Jan. 8, 2013

(86) PCT No.: PCT/EP2013/050197
§ 371 (c)(1),
(2) Date: Jul. 29, 2014

(87) PCT Pub. No.: WO2013/113528
PCT Pub. Date: Aug. 8, 2013

(65) Prior Publication Data
US 2015/0001027 A1    Jan. 1, 2015

(30) Foreign Application Priority Data

Feb. 2, 2012  (DE) .......................... 10 2012 201 509

(51) Int. Cl.
*F16D 25/00*    (2006.01)
*F16D 13/38*    (2006.01)
(Continued)

(52) U.S. Cl.
CPC ................. *F16D 13/38* (2013.01); *F16D 25/06* (2013.01); *F16D 25/0638* (2013.01); *F16D 25/123* (2013.01); *F16D 2300/08* (2013.01)

(58) Field of Classification Search
CPC ..... F16D 13/38; F16D 25/06; F16D 25/0638; F16D 25/123; F16D 2300/08
USPC .......... 192/85.01, 85.24, 55.61, 85.29, 85.61, 192/3.33, 3.31, 3.3, 70.17, 212, 66.1, 70.16, 192/70.11
See application file for complete search history.

(56) References Cited

U.S. PATENT DOCUMENTS 5,887,690 A * 3/1999 Haupt ....................... 192/48.611
6,454,074 B1 * 9/2002 Kundermann et al. .. 192/48.618
(Continued)

FOREIGN PATENT DOCUMENTS

DE         10125628      9/2002
DE      102005021899    11/2006
(Continued)

*Primary Examiner* — David J Hlavka
(74) *Attorney, Agent, or Firm* — Cozen O'Connor

(57) ABSTRACT

A clutch arrangement for a drivetrain of a vehicle comprises a first friction surface, a second friction surface, a pressing element and a sealing element. The second friction surface is coupled to an output component of the clutch arrangement to be substantially fixed with respect to rotation relative to the output component. The first and second friction surfaces are configured and arranged to be brought into frictional engagement with each other to make a torque transmittable from the first friction surface to the second friction surface. The first and second friction surfaces are further configured to be exposed to a fluid medium. The pressing element is configured to produce or sever the frictional engagement by causing a force along a force direction when actuated. The sealing element is configured to separate a first volume in which the first and second friction surfaces are arranged from a second volume.

15 Claims, 8 Drawing Sheets

(51) Int. Cl.
*F16D 25/0638* (2006.01)
*F16D 25/12* (2006.01)
*F16D 25/06* (2006.01)

(56) References Cited

U.S. PATENT DOCUMENTS

| | | | |
|---|---|---|---|
| 6,622,839 B2* | 9/2003 | Kundermann et al. | 192/48.9 |
| 7,114,605 B2* | 10/2006 | Grosspietsch et al. | 192/48.8 |
| 7,431,138 B2* | 10/2008 | Heinrich et al. | 192/85.39 |
| 2005/0224308 A1* | 10/2005 | Hauck et al. | 192/70.12 |
| 2009/0283344 A1* | 11/2009 | Arnold et al. | 180/65.22 |
| 2011/0073434 A1* | 3/2011 | Gold et al. | 192/85.01 |
| 2012/0205213 A1* | 8/2012 | Sudau et al. | 192/3.33 |

FOREIGN PATENT DOCUMENTS

| | | |
|---|---|---|
| DE | 102009016414 | 10/2009 |
| DE | 102008060580 | 12/2009 |
| DE | 102009042065 | 4/2010 |
| WO | WO2008/092426 | 8/2008 |
| WO | WO2008/151694 | 12/2008 |

* cited by examiner

CLUTCH ARRANGEMENT AND SEALING ELEMENT

CROSS-REFERENCE TO RELATED APPLICATIONS

This is U.S. national stage of PCT Application No. PCT/EP2013/050197, filed on Jan. 8, 2013, which claims priority to German Patent Application No. DE 10 2012 201 509.4, filed on Feb. 2, 2014, each of which is hereby incorporated herein in its entirety by reference.

FIELD OF INVENTION

The present invention is related to a clutch arrangement such as can be used, for example, in a drivetrain of a vehicle, for example, of a motor vehicle, and to a sealing element for a clutch arrangement of this type.

DESCRIPTION OF THE RELATED ART

Clutches are used in a wide variety of forms in the vehicle sector, particularly in the motor vehicle sector. They are often utilized within the framework of a drivetrain of a corresponding vehicle for transmitting torque and are used, for example, between a drive unit, i.e., an engine, for example, and a downstream transmission. In this way, it is possible to separate the drivetrain such that the engine can continue to run even when the vehicle is at a standstill, for example. In this case, that is, the clutch separates the rotating engine output shaft from a stationary transmission input shaft.

However, clutches can also be used in other configurations in the drivetrain of a vehicle. For example, in the case of hybrid drives, they can also be used between different drive units or for dividing the torque flow in front of or behind a transmission. Further, clutches can be used in connection with different drive unit technologies, such as internal combustion engines and electric motors, and in combination with different transmission techniques, such as synchronized and non-synchronized transmissions. Manual transmissions can be used as well as automatic transmissions in which gears can be changed manually, where appropriate, via electric, electronic or other control pulses.

Clutches are often based on producing a frictionally engaging contact between corresponding component parts which are coupled with a drive component and with an output component of the relevant clutch. It is in case of sharply diverging rotational speeds such as can occur, for example, during starting, that energy is converted into heat in the area of the friction surfaces due to the existing slip conditions. This can lead to an unwanted heating of the relevant friction surfaces or also of the relevant component parts. For this reason, among others, clutches are used in which, for example, a fluid medium circulates in an interior of a housing, the heat generated at the friction surfaces being at least partially removed from the friction surfaces by this fluid medium.

The subject matter disclosed in German Patent Application No. DE 10 2009 016 414 A1 is directed to a clutch arrangement in which a corresponding fluid flow is built up in a housing by providing vane-like conveying surfaces at a friction element. The subject matter disclosed in German Patent Application No. DE 101 25 628 A1 is also directed to a clutch arrangement in which at least one friction member is formed for generating a fluid circulation which flows around at least some areas of the friction members, the transmission of torque being carried out via the friction members. Further, the subject matter disclosed in German Patent Application No. DE 10 2009 042 065 A1 is directed to a force transmission device for use in drivetrains of vehicles in which a spring unit which can be constructed as a leaf spring, disk spring or in the form of an elastic diaphragm causes an axial pre-loading of a piston element when the piston element is in a pressureless condition.

SUMMARY OF THE INVENTION

Therefore, in view of the above, there is a need to improve a shiftability of a clutch arrangement having friction surfaces which are exposed to a fluid medium during operation of the clutch arrangement, and this need is met by a clutch arrangement and a sealing element described by the claimed invention.

In one embodiment, a clutch arrangement, for example, for a drivetrain of a vehicle, comprises a first friction surface and a second friction surface which is coupled with an output component of the clutch arrangement to be substantially fixed with respect to rotation relative to it. The first friction surface and second friction surface are configured and arranged such that they can be brought into frictional engagement with one another to make a torque transmittable from the first friction surface to the second friction surface, wherein the first friction surface and the second friction surface are further configured to be exposed to a fluid medium during an operation of the clutch arrangement.

The clutch arrangement further comprises a pressing element which is configured such that when actuated it produces or severs the frictional engagement by causing a force along a force direction. The clutch arrangement further comprises a sealing element which separates a first volume in which the first friction surface and the second friction surface are arranged from a second volume, the sealing element being arranged along force direction between the pressing element and a housing of the clutch arrangement to reduce a change in a pressure in the second volume during operation of the clutch arrangement. The housing of the clutch arrangement is often a drive component of the same via which the torque to be transmitted is transmittable to, or can be transmitted to, the clutch arrangement.

Accordingly, some embodiments are based upon the insight that a shiftability of a clutch arrangement can be improved in that the sealing element which separates the first volume from the second volume is arranged precisely along force direction between the pressing element and the housing of the clutch arrangement so that a change in pressure in the second volume is reduced and can possibly be eliminated due to an existing flow of the fluid medium in the housing possibly during operation. Thus, for example, even in a clutch arrangement in which a flow of the fluid medium, i.e., an oil, for example, is used for cooling the first friction surface and second friction surface, a drop in hydrodynamic pressure at the pressing element caused by this flow can be reduced and possibly even completely eliminated. Accordingly, changes in forces which act on the pressing element and, therefore, on the friction surfaces and which are caused by a change in the flow of the fluid medium can also be reduced or even completely eliminated.

By a substantially rotationally fixed coupling is meant herein that the relevant component parts are coupled to be fixed with respect to rotation relative to one another or are rotatingly coupled with one another such that they substantially rotate with one another, but any relative torsion that may occur between the component parts involved is limited to a predetermined angular range. Such variation in angular range can be ascribed to mechanical deformations of the component parts involved, geometric relationships or the like effects, for example. Therefore, a substantially rotationally fixed connection of two components likewise includes a rotationally fixed connection.

Accordingly, in a clutch arrangement of the type mentioned above according to one embodiment, the second volume can be coupled with a feed channel for the fluid medium or a further fluid medium to enable the fluid medium or a further fluid medium to flow in or flow out upon actuation of the pressing element. Accordingly, the sealing element can be configured and arranged such that a change in pressure in the second volume during operation of the clutch arrangement is also reduced, possibly also completely eliminated, upon actuation of the pressing element such that the pressure in the second volume, for example, remains substantially unchanged or constant.

In a clutch arrangement according to one embodiment, the pressing element can be configured to cause the force along force direction through a movement along force direction. The sealing element can be configured to be deformable in a corresponding manner so that it can yield to a movement of the pressing element along force direction by deforming. In a clutch arrangement of this type according to one embodiment, the sealing element can accordingly absorb, or compensate for, a movement of the pressing element along force direction. In this way, it may be possible where appropriate to improve the separability of the clutch arrangement in that the latter has a lower friction between the friction surfaces in an open or separated condition because the friction surfaces can be separated from each other better due to the movability of the pressing element along force direction.

In addition or alternatively, it may be possible where applicable also to implement an engagement of the clutch arrangement, i.e., to produce the frictional engagement, in a controlled manner because a softer engagement or a softer production of the frictional engagement may be possible due to the movability of the pressing element along force direction.

In a clutch arrangement according to one embodiment, the second volume can be at least partially limited by a surface portion of the pressing element. A surface of this kind can be arranged substantially perpendicular to force direction, for example. The surface portion can be on a side of the pressing element facing the housing. The use of the sealing element may be advantageous precisely in an arrangement of this kind because a flow which is generated in the interior of the housing and which can lead to changes in pressure conditions can cause a force to act upon the surface portion of the pressing element in a corresponding manner, but the force can be reduced, if not fully eliminated, through the use of a sealing element.

In a clutch arrangement of this type according to one embodiment, a piston pressure space can adjoin a side of the pressing element remote of the second volume, wherein an extension of the surface portion of the pressing element along a radial direction of the clutch arrangement can differ from an extension of the piston pressure space along radial direction by at most 30% of the greater extension of the surface portion of the pressing element and of the piston pressure space. The use of the sealing element may be advantageous precisely in an arrangement of this kind. For example, a change in pressure acting on the surface portion of the pressing element can occur due to a centrifugal force acting on the fluid medium. Therefore, since the centrifugal force is also present in the piston pressure space, it may be advisable to allow pressure changes brought about by centrifugal force to act upon comparable surfaces. In this way, it may be possible to achieve full compensation, but also an under-compensation or over-compensation. But regardless of this, it may be advisable to limit the above-mentioned difference to at most 25%, at most 20%, at most 15%, at most 10%, or at most 5% to limit the occurring differences in force.

In a clutch arrangement according to one embodiment, the pressing element can be constructed in such a way that the force direction corresponds to a direction of an axis of rotation of the clutch arrangement. In other words, the sealing element can be arranged between the pressing element and the housing along the axis of rotation of the clutch arrangement, i.e., the axis of rotation is an axis of rotation in the mathematical sense, i.e., for example, an axial direction of the clutch arrangement. Accordingly, in a clutch arrangement according to one embodiment, the components of the clutch arrangement can be configured substantially rotationally symmetrically with respect to the axis of rotation, and the axis of rotation of the clutch arrangement can also be an axis of rotation shared by the components.

In a clutch arrangement according to one embodiment, the sealing element can further be configured to exert a force on the pressing element such that the pressing element is set by the force to a starting position prior to an actuation of the same. Accordingly, the sealing element can further be optionally configured to exert a force of this kind on the pressing element to set the pressing element to a starting position prior to an actuation of the same without actuation. In other words, the sealing element can be configured to serve as diaphragm spring element, disk spring element or leaf spring element in the clutch arrangement. In this way, it may be possible where applicable to economize on a separate spring element in a clutch arrangement of this type, which spring element is utilized for severing or producing the frictional engagement in the starting position depending on the specific implementation of the clutch arrangement. Accordingly, the sealing element can adopt the function of a spring element of this type. In this way, not only can the sealing element take on two functions but, much more, a production of a clutch arrangement of this type can be facilitated because a component part can possibly be eliminated.

A clutch arrangement according to one embodiment can further comprise a conveying component in the first volume, which conveying component is coupled with the housing, i.e., with the drive component in many embodiment examples, to be substantially fixed with respect to rotation relative to it and is configured to cause a flow of the fluid medium during a rotation relative to the fluid medium. The use of the sealing element can be particularly advantageous precisely in a clutch arrangement of this type according to one embodiment because, by providing the conveying component, a pumping action is generated in the first volume during a relative movement with respect to the fluid medium. Accordingly, a drop in pressure can be brought about in the first volume due to the conveying component and the flow caused by the conveying component. In such a case, it is precisely the sealing element in one embodiment of a clutch arrangement that protects against a drop in pressure in the second volume caused by such a drop in pressure in the first volume, so that the shiftability of the clutch arrangement is improved even when a flow is correspondingly present, i.e., when there is a corresponding conveying power of the conveying component.

In a clutch arrangement according to one embodiment, the sealing element can have a disk-shaped first portion with a first sealing surface and a disk-shaped second portion with a second sealing surface, the first portion and the second portion being connected to each other through a transitional portion. By providing corresponding first and second sealing surfaces, a sealing action and, therefore, a fluidic seal, can be improved, e.g., over other implementations, because providing two-dimensional sealing surfaces reduces the probability that a channel will be formed through which the fluid medium can pass from the first volume to the second volume or in opposite direction.

In such an embodiment of a clutch arrangement, the first sealing surface and second sealing surface can be oriented substantially parallel to and perpendicular to the axis of rotation of the clutch arrangement. In other words, the first sealing surface and second sealing surface in one embodiment of this kind can lie parallel to a plane extending through a radial direction directed away from the axis of rotation of the clutch arrangement and to a circumferential direction or tangential direction of the clutch arrangement perpendicular to both of these directions.

In such a clutch arrangement according to one embodiment, the first sealing surface and/or the second sealing surface can have along a radial direction, i.e., directed away perpendicularly from the axis of rotation, a dimension corresponding to approximately 5% of a dimension of the transitional portion along the radial direction. Alternatively or in addition, in a clutch arrangement of this type the first sealing surface and/or the second sealing surface can also have along the radial direction a dimension which is greater than a dimension of the transitional portion along the radial direction. Accordingly, the first sealing surface and/or the second sealing surface can be further improved with respect to their sealing action by a corresponding configuration of their surface dimensions. Accordingly, it may be possible where applicable to also provide in the first case mentioned above at least 10%, at least 30%, at least 50%, or at least 75% of the dimension of the transitional portion along radial direction.

Depending on the specific configuration of the sealing element, the transitional portion can be utilized, for example, to cause the spring effect which was described above. But regardless of this, a deformation of the first sealing surface and/or second sealing surface can also be brought about by a corresponding deformation of the sealing element.

In a clutch arrangement of this type according to one embodiment, the first sealing surface can be in contact, for example, with an annular surface portion of the housing, of the drive component and/or of another supporting component part, and the second sealing surface can be in contact with an annular surface portion of the pressing element. Depending upon the specific implementation, the housing, the drive component and the supporting component can be one and the same component.

In a clutch arrangement of this type, the first sealing surface and the second sealing surface can be offset relative to each other along a radial direction. In addition or alternatively, they can also be arranged to be offset relative to each other along the axis of rotation of the clutch arrangement. Accordingly, it may be possible where applicable to further improve the sealing action of the sealing element in that particularly small kink radii or bend radii in the region of the sealing element at which especially high forces may occur within the material of the sealing element or at the upper surface thereof can be prevented as a result of the above-described geometric configurations. High forces especially can lead to a greater deformation of the sealing element so that the sealing surfaces could be hindered from contacting the surface portions of the relevant counterpart components. Also, material fatigue may occur in the area of the small bend radii, which could lead to a reduced life of the clutch arrangement. Accordingly, a sealing action of the sealing element and/or the lifetime of the sealing element may be further improved.

In a clutch arrangement according to one embodiment, the sealing element can be formed in one piece. In this case, that is, the sealing element can be fashioned from exactly one contiguous piece of material and, therefore, the expressions "formed in one piece", "integral" and "of one part" may be used synonymously. Accordingly, it may be possible where applicable to simplify the production of the sealing element and, therefore, of the clutch arrangement.

In a clutch arrangement according to one embodiment, the sealing element can be produced by deforming a sheet-like workpiece, by a cutting production method or by a casting production method. Accordingly, in one embodiment of a clutch arrangement the sealing element can be produced using a comparatively simple and inexpensive production method such as deforming a sheet-like workpiece so that production resources can be considerably reduced compared to other production methods. On the other hand, it may be advisable and profitable to produce the sealing element using more elaborate production methods, for example, a cutting production method or casting production method, when the sealing element shows such production method to be reasonable, for example, in view of particular loads to be anticipated.

In a clutch arrangement according to one embodiment, the sealing element can be connected to the housing to be substantially fixed with respect to rotation relative to it, for example, by a rivet connection and/or a plug-in connection, and can be configured to produce a connection between the housing and another component part such that they are substantially fixed with respect to rotation relative to each other. In this way, it may be possible using the sealing element to transmit a rotational movement of the housing, i.e., for example, the drive component, to the other component part, for example, a component of the pressing element or a component part connected to the pressing element. In this way, it may be possible where applicable to omit a component part transmitting a corresponding rotational movement and thus not only to simplify the construction of the clutch arrangement but also to reduce the installation space thereof.

In a clutch arrangement of this type, the sealing element can have a plurality of leaf spring elements which are connected to the other component part of the clutch arrangement by positive engagement, for example, using a rivet connection and/or a plug-in connection, to produce the connection between the further component part and the housing such that they are substantially fixed with respect to rotation relative to each other. Owing to their leaf-shaped design, the use of leaf spring elements can allow the further component part to be displaced along the axis of rotation, i.e., to be moved along axial direction of the clutch arrangement, while forces can be transmitted perpendicular to the axis of rotation. Accordingly, particularly tangentially acting forces which bring about torque can be transmitted using corresponding leaf spring elements. Further, particularly with a sealing element produced from a sheet-like workpiece and/or with a one-piece sealing element, the use of leaf spring elements can make it possible to integrate the functionality of the transmission of a torque to the further component part using simply constructed means. Accordingly, in this type of embodiment example of a clutch arrangement, the leaf spring elements can be formed integral with the sealing element, for example.

A sealing element for a clutch arrangement according to one embodiment comprises a disk-shaped first portion which comprises a first sealing surface, a disk-shaped second portion which comprises a second sealing surface, and a transitional portion which connects the first portion to the second portion, and the first sealing surface is configured to contact an annular first surface portion of a component part, and the second sealing surface is configured to contact an annular second surface portion of the component part or of a further component part. Accordingly, the sealing element can be configured to produce a fluidic seal.

It can also be configured to exert a force on a pressing element of the clutch arrangement such that the pressing element is set by the force to a starting position prior to an actuation thereof, to produce a frictional engagement for transmitting torque between the first friction surface and the second friction surface, or to sever such a frictional engagement. In other words, the sealing element can be configured to produce a fluidic seal and to serve as a diaphragm spring element, disk spring element or leaf spring element in the clutch arrangement, for example, for a drivetrain of a vehicle.

In this regard, a frictionally engaging connection is brought about by static friction, a bonding connection is brought about by molecular or atomic interactions and forces, and a positively engaging connection is brought about by geometric connection of the relevant mating parts. Accordingly, the static friction generally presupposes a normal force component between the two mating parts.

BRIEF DESCRIPTION OF THE DRAWINGS

Presently preferred embodiments of the present invention will be described and explained more fully in the following referring to the accompanying drawings, in which.

Figure 1:
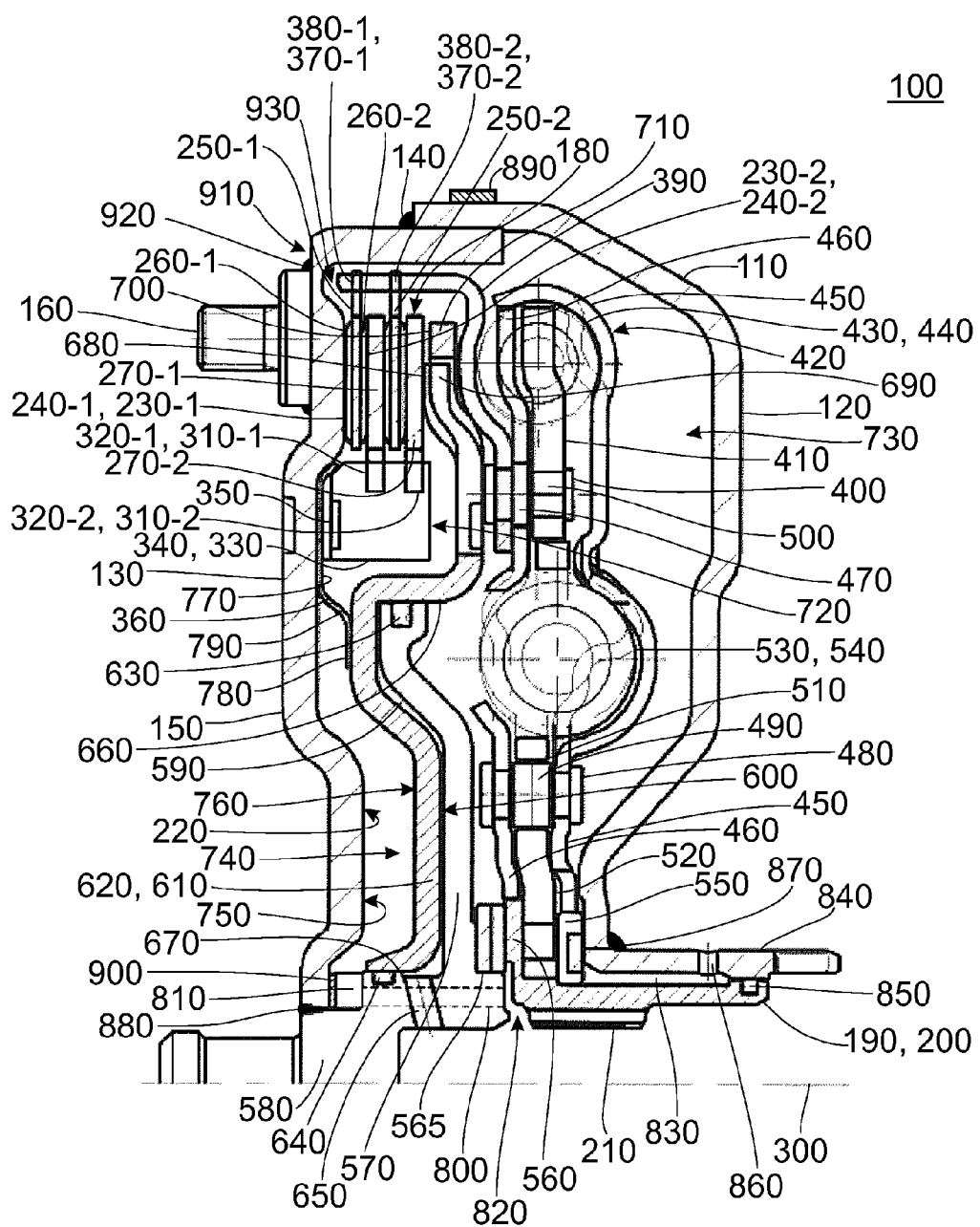
FIG. 1 shows a cross-sectional view through a clutch arrangement in accordance with one embodiment of the present invention.

Identical or comparable components are denoted by identical reference numerals in the following description of the accompanying drawings. Further, collective reference numerals are used for components and objects which occur more than once in an embodiment or diagram but which are described collectively with respect to one or more features. Components or objects which are denoted by identical reference numerals or collective reference numerals may be constructed identically or possibly also differently with respect to one or more or all features, for example, their dimensions, unless otherwise explicit or implicit from the description.

DETAILED DESCRIPTION OF THE PRESENTLY PREFERRED EMBODIMENTS

FIG. 1 shows a cross-sectional view through a clutch arrangement 100 according to one embodiment. The clutch arrangement 100 can be used, for example, in a drivetrain of a vehicle, for example, to convey a torque supplied by a drive unit to a transmission or to another component in a separable manner. Therefore, the clutch arrangement 100 can be used, for example, as a separating clutch when combined with a synchronized transmission or as a starting clutch in combination with a non-synchronized transmission, for example, a corresponding automatic transmission.

Clutch arrangement 100 comprises a housing 110 which is constructed in the present instance as a two-part housing with a first housing shell 120 and a second housing shell 130. The second housing shell 130 is also referred to as engine-side cover of clutch arrangement 100. The two housing shells 120, 130 are connected to each other via a weld connection 140. Housing 110 can accordingly be filled, or is filled, with a fluid medium, for example, an oil or other liquid which is suitable for absorbing and carrying off heat occurring in the interior of housing 110.

In the clutch arrangement 100 shown in FIG. 1, second housing shell 130 and, therefore, housing 110 serve as drive component 150. To this end, second housing shell 130 has a weld bolt 160 for fastening to a flexplate or to a flywheel of a drive unit, for example, of an engine, or to another component of the drivetrain. Alternatively, a stud or other fastening structure for fastening the clutch arrangement 100 can be implemented instead of the weld bolt 160.

Specifically, the clutch arrangement 100 shown in FIG. 1 is a multidisk clutch or multiplate clutch. Correspondingly, clutch arrangement 100 has in an interior space of the housing 110 a friction pack 180 having a plurality of first friction surfaces 230 and second friction surfaces 240. The first friction surfaces are coupled with the drive component 150 or housing 110 to be at least substantially fixed with respect to rotation relative to it via components which will be described in the following, and the second friction surfaces 240 are coupled with an output component 190 of the clutch arrangement to be at least substantially fixed with respect to rotation relative to it. Specifically, output component 190 is a lower hub 200 which can be coupled by positive engagement with a transmission input shaft (not shown in FIG. 1) via an internal toothing 210. The transmission input shaft has an external toothing corresponding to internal toothing 210.

In the embodiment example of a clutch arrangement 100 shown in FIG. 1, friction pack 180 comprises a first friction surface 230-1 which is formed at an inner surface 220 of housing 110 or of second housing shell 130 and which is in frictional engagement, or can be brought into frictional engagement, with a corresponding second friction surface 240-1 of an outer plate 250-1. Outer plate 250 is lined with a friction facing 260-1 at which second friction surface 240-1 is formed. In contrast, first friction surface 230-1 is formed directly at the inner surface 220 of housing 110, i.e., for example, as a steel surface, when housing 110 is also fashioned from steel.

Outer plate 250-1 has at a side remote of inner surface 220 a further friction facing 260-2 which forms a further second friction surface 240-2 at an upper surface. Second friction surface 240-2 is in frictional engagement with an inner plate 270-1, or can be brought into frictional engagement with the latter, via a corresponding first friction surface 230-2.

Further, friction pack 180 has a further outer plate 250-2 and a further inner plate 270-2. Outer plate 250-2 also has corresponding friction facings 260 which, like the first and second friction surfaces 230, 240, are not provided with reference numerals in FIG. 1 for the clarity. Outer plate 250-2 is arranged between the two inner plates 270-1 and 270-2. Friction pack 180 is accordingly limited by inner plate 270-2 at a side remote of inner surface 220 of housing 110.

Inner plates 270 are implemented as substantially disk-shaped steel component parts and form corresponding components which are at least partially disk-shaped and at which first friction surfaces 230 are arranged in the region of the disk-shaped portions. The outer plates 250 are implemented using the friction facings 260 thereof as at least partially disk-shaped components having second friction surfaces 240 at the disk-shaped portions thereof. Friction facings 260 can also be provided at the other respective components in other embodiment examples.

Inner plates 270 and outer plates 250 have in each instance a central recess with respect to an axis of rotation 300, inner plates 270 and outer plates 250 being arranged to be rotatable exactly around axis of rotation 300. Therefore, axis of rotation 300 also represents the axis of rotation of the clutch arrangement 100 in a mathematical sense and is also referred to as axial direction.

To allow torque to be transmitted from the housing 110 serving as drive component 150 to the inner plates 270, inner plates 270 have in each instance a portion 310-1, 310-2 at which a driver surface 320-1, 310-2 is formed at a lateral face, inner plates 270 engaging in each instance with a conveying surface 330 of a conveying component 340 via these driver surfaces 320-1, 320-2 such that, when conveying component 340 rotates, the respective inner plates 270 are also set in rotation. Conveying component 340 is substantially annularly shaped and extends around axis of rotation 300 along a circumference of clutch arrangement 100. In the embodiment example shown in FIG. 1, conveying component 340 is substantially meander-shaped such that conveying surfaces 330 run substantially perpendicular to a circumferential direction of clutch arrangement 100, i.e., substantially perpendicular to a tangential direction, this tangential direction being perpendicular to axis of rotation 300 and to a radial direction facing away from axis of rotation 300 in the corresponding cross-sectional plane.

Specifically, conveying component 340 has a plurality of conveying surfaces 330. These conveying surfaces 330 are evenly arranged, for example, along the circumference of conveying component 340. Correspondingly, portions 310 of inner plate 270 also have a corresponding quantity of driver surfaces 320 with which the plurality of conveying surfaces 330 engage. Conveying component 340 and portions 310 of inner plates 270 accordingly form teeth which mesh with each other. In this way, the torque to be transmitted can be distributed to a greater quantity of conveying surfaces 330 and driver surfaces 320 such that it may be possible where applicable to transmit a correspondingly higher torque to inner plates 270 and, therefore, through clutch arrangement 100.

Conveying component 340 is connected to a sealing element 360 and second housing shell 130 to be fixed with respect to rotation relative to the latter and in a positively engaging manner via a rivet connection 350. Accordingly, via rivet connection 350 and, as the case may be, via sealing element 360, a rotational movement of drive component 150, i.e., housing 110, is transmitted to conveying component 340 and, therefore, to conveying surfaces 330. Torque is accordingly transmitted to inner plates 270 using the engagement of inner plates 270 with conveying component 340 via conveying surfaces 330 and driver surfaces 320.

Outer plates 250 also have portions 370-1 and 370-2 which engage via corresponding further driver surfaces 380 with a support 390, also referred to as outer plate support, and in case a frictional engagement is provided, receive the torque transmitted from inner plates 270 to outer plates 250.

Support 390 has a substantially pot-shaped structure with a central recess and is coupled with a first hub disk 410 of a two-stage vibration damper 420 via a rivet connection 400. First hub disk 410 is coupled with support 390 via a spacer 500. Spacer 500 is formed as part of rivet connection 400 but can also be formed separately from the latter.

Vibration damper 420 has a plurality of first spring elements 430 which are arranged along a circumference of first hub disk 410 and contact the latter by one end in each instance. First spring elements 430 are implemented as helical springs 440. The helical springs 440 or first spring elements 430 contact a first cover plate 450, also designated as right-hand cover plate based on the arrangement shown in FIG. 1, by the other respective end. First cover plate 450 is connected to a second cover plate 460, also designated as left-hand cover plate, via a spacer 490. Together, the latter form an unclosed housing for the damper element 430. The second cover plate 460 leads radially inward in one piece.

Rivet connection 400 and spacer 500 by which support 390 is connected to first hub disk 410 of vibration damper 420 is guided through ring-segment-shaped elongated hole 470 which defines a maximum movement amplitude of the two cover plates 450, 460 relative to first hub disk 410 and, therefore, to support 390.

Second cover plate 460 extends in radial direction appreciably farther than first cover plate 450 extends in direction toward axis of rotation 300. Accordingly, first cover plate 450 is mechanically connected via a further rivet connection 480 and spacer 490 to second cover plate 460 to be fixed with respect to rotation relative to it. Spacer 490 extends through an elongated hole 510, which is also shaped like a ring segment, into a second hub disk 520. Second hub disk 520 and first cover plate 450 are coupled with each other via second spring elements 530 which are also implemented again in this case as helical springs 540. Second cover plate 460 accordingly leads in one piece radially inward via the second spring set with second spring elements 530.

In some embodiments of a clutch arrangement 100, other spring elements can also be used as first spring elements 430 and second spring elements 530. For example, barrel springs or elastomer-based spring elements can also be used insofar as suited to technical constraints, i.e., particularly the chemical and/or thermal constraints existing in housing 110.

Second hub disk 520 is further connected to the lower hub 200, i.e., to output component 190, to be fixed with respect to rotation relative to it. In this case also, a rivet connection can be used, for example. However, other connection techniques, for example, positively engaging, frictionally engaging and/or bonding connection techniques, can also be used. For example, second hub disk 520 and lower hub 200 can be welded together. In addition or alternatively, however, plug-in connections can also be implemented. Accordingly also instead of the other rivet connections described above, they can be realized additionally or alternatively as plug-in connections or using other connection techniques.

The torque is transmitted from outer plates 250 via support 390 and first hub disk 410 via spring elements 430 to cover plates 450, 460. From the latter it is further conveyed via second spring elements 530, via second hub disk 520 and lower hub 200 to the transmission input shaft (not shown in FIG. 1) when the first friction surfaces 230 and second friction surfaces 240 engage with each other.

In the embodiment example shown in FIG. 1, second hub disk 520 is supported opposite first housing shell 120 to be rotatable with respect to axis of rotation 300 using a bearing 550, specifically in the present case using an axial friction bearing. At the side of second hub disk 520 remote of bearing 550, second hub disk 520 is supported against a portion 560 of lower hub 200 which is in turn supported via a further bearing 565 to be rotatable around axis of rotation 300 with respect to a dividing wall 570. The further bearing 565 is also an axial friction bearing in the embodiment example shown in FIG. 1. Dividing wall 570 is part of a front hub 580 and defines a piston pressure space 590 at least on one side. This piston pressure space 590 is limited along axial direction, i.e., along axis of rotation 300, by a piston face 600 of a piston 610. As will be shown in the further description, piston 610 forms a pressing element 620 which is configured and arranged to bring first friction surfaces 230 and second friction surfaces 240 into frictional engagement with each other upon actuation. In other embodiment examples, pressing element 620 can also be configured to sever the frictional engagement. However, as will also be illustrated in more detail in the following description, the clutch arrangement shown in FIG. 1 is a normally open clutch in which there is no frictional engagement or only a slight frictional engagement in pressureless condition, i.e., in the absence of actuation. In the embodiment example shown here, pressing element 620 is configured to bring first friction surfaces 230 and second friction surfaces 240 into frictional engagement with each other upon actuation.

Piston pressure space 590 is sealed using two sealing elements 630 and 640 relative to pressing element 620 on the one hand and front hub 580 on the other hand. In order to fill the piston pressure space with a corresponding pressurized medium which can be, for example, the same fluid medium with which the rest of housing 110 can also be filled, front hub 580 has an inlet bore 650 to piston pressure space 590 which fluidically joins piston pressure space 590 with a region of the central recess which faces second housing shell 130 and in which the transmission input shaft is also arranged.

To allow a movement of pressing element 620 along rotational direction 300, the two sealing elements 630, 640 are arranged in each instance in a corresponding groove in dividing wall 570 and front hub 580 and are oriented such that they contact a corresponding sealing surface 660 and 670 of pressing element 620 extending along rotational direction 300.

Pressing element 620 extends along radial direction, i.e., proceeding from axis of rotation 300, perpendicular to the latter to the level of inner plates 270 and outer plates 250. Pressing element 620 has in this region a first pressing surface 680 which faces first friction surfaces 230 and second friction surfaces 240, i.e., outer plates 250 and inner plates 270. In the embodiment example shown in FIG. 1, first pressing surface 680 is formed by a cropping of pressing element 620 by which a nose 690 is formed, this nose 690 presenting toward first friction surfaces 230 and second friction surfaces 240 opposite the pressing element 620 in this region. Accordingly, nose 690 is connected to pressing element 620 via a piece of material from which pressing element 620 is fashioned, i.e., for example, a steel or other metal material, and therefore has a smaller spring constant compared to pressing element 620. The clutch arrangement 100 shown in FIG. 1 has a plurality of noses 690 which are arranged to be distributed along the circumference of the clutch arrangement. The arrangement can be uniform or irregular.

Nose 690 contacts a back side of inner plate 270-2 via first pressing surface 680. Pressing element 620 is accordingly formed using nose 690 to generate a pressing force in direction of first friction surfaces 230 and second friction surfaces 240 via first pressing surface 680 of pressing element 620, using which pressing force the frictional engagement can be produced therebetween. Because of the decreased spring constant compared to the rest of pressing element 620, a softer engagement can be possible, if required, by providing first pressing surface 680 at nose 690.

Beyond this, however, pressing element 620 further has a second pressing surface 700 which is formed at a portion 710 of pressing element 620 rather than at nose 690. With respect to its spring characteristics, i.e., for example, its spring constants, portion 710 differs appreciably less from the other regions of pressing element 620 than is the case with nose 690, for example. The spring constant of portion 710 is typically appreciably greater than that of nose 690, i.e., for example, at least two times, at least five times or at least ten times greater.

If pressing element 620 is now moved along axis of rotation 300 to first friction surfaces 230 and second friction surfaces 240, that is, moved to the left referring to FIG. 1, a comparatively soft engagement is initially carried out via first pressing surface 680 of noses 690. If pressing element 620 is moved farther, the deformation of noses 690 increases and the pressing force exerted via first pressing surface 680 on plates 250, 270 and, therefore, on the corresponding friction surfaces 230, 240 is greater. If pressing element 620 is moved sufficiently far to cause the pressing force via second pressing surface 700 of portion 710, an appreciably higher, virtually surging pressing force is transmitted to friction surfaces 230, 240. Apart from elastic deformations of pressing element 620 and possibly of friction facings 260, pressing element 620 is now in an end condition in which clutch arrangement 100 is completely engaged. A further increase is also still possible in this region through a corresponding increase in a force driving pressing element 620 in direction of first friction surfaces 230 and second friction surfaces 240 but without significant movement of pressing element 620.

While first pressing surface 680 generally continues to remain in contact with inner plate 270-2 in the above-described transition from first pressing surface 680 to second pressing surface 700, it transmits substantially smaller forces compared to second pressing surface 700, these forces resulting from the ratio of the corresponding spring constants of nose 690 and of that of portion 710. In this condition, pressing element 620 substantially contacts inner plate 270-2 along the entire circumference of pressing element 620.

To prevent an effective pressing point from shifting during an engagement of clutch arrangement 100, surface center points or effective contact points of the relevant two pressing surfaces 680, 700 can substantially coincide in the embodiment of the pressing element 620 shown in FIG. 1 taking into account the corresponding counterpart component, i.e., in the present instance taking into account inner plate 270-2. Further, in the implementation of pressing element 620 shown in FIG. 1, a pressing surface can be increased. In this way it may be possible where applicable to transmit a greater pressing force because of the higher surface substantially without the risk of changing the effective pressing point.

A shifting of the effective pressing point could lead to a change in the existing pressure ratios at the first friction surfaces 230 and second friction surfaces 240, which pressure ratios can be brought about, for example, by an elasticity of friction facings 260 or of the relevant inner plates 270 and outer plates 250 and other component parts. Accordingly, a point on the friction surfaces 230, 240 at which a maximum heat can be transmitted because of the friction occurring during engagement can be displaced. Thus it may happen under certain circumstances that a cooling of the first friction surfaces 230 and second friction surfaces 240 through the aforementioned fluid medium in the interior of housing 110 is less efficient. Also, an irregular wear of friction facings 260 may be brought about. Further, due to the axial movability of inner plates 270 and outer plates 250, it can also happen under certain circumstances that a slight tilting of the plates 250, 270 comes about in the region of their respective teeth or meshing engagements with conveying component 340 and support 390 so that the corresponding effect may be further reinforced.

Pressing element 620, outer plates 250, inner plates 270 and sealing element 360 at least partially limit a first volume 720 of an inner volume of clutch arrangement 100. As has already been mentioned briefly in connection with conveying component 340, conveying component 340 has a plurality of conveying surfaces 330 which do not only engage with the driver surfaces 320 of the inner plates 270; on the contrary, conveying surfaces 330 are also formed to cause a flow of the fluid medium in the interior of housing 110 when the conveying surfaces move relative to the fluid medium. To this end, conveying component 340 is connected to housing 110 serving as drive component 150 to be fixed with respect to rotation relative to it. In the embodiment example shown in FIG. 1, conveying surfaces 330 are not least arranged in first volume 720 so that the fluid medium located in this first volume 720 is conveyed during a movement of conveying surfaces 330 relative to the fluid medium.

To allow the fluid medium to be conveyed as efficiently as possible, it may be advisable in this connection to allow the inner plates 270 to engage with conveying surfaces 330 of conveying component 340 via driver surfaces 320 such that a contacting surface between the relevant driver surfaces 320 and conveying surface 330 is at most 50% of a surface area of the conveying surface. Given a sufficient stability and force transmission or torque transmission to driver surfaces 320 of inner plates 270 via conveying surfaces 330, a further reduction in relation to the above-mentioned ratio may lead to an improved flow. It may be advisable in other clutch arrangements 100, for example, to limit the above-mentioned ratio to at most 30%, at most 25%, at most 20%, at most 15%, or at most 10%. A lower limit for this ratio must be sought in the dual function of the conveying surface area on the one hand and the engagement surface area on the other hand.

As is shown in FIG. 1, conveying surfaces 330 are contiguous and flat. They are oriented along the circumferential direction or tangential direction, i.e., substantially perpendicular to axis of rotation 300 and radial direction facing away from the latter. This configuration can be advantageous as regards the torque-transmitting characteristics of conveying surfaces 330 because, in this way, axial forces along axis of rotation 300 can be reduced or even prevented via driver surfaces 320 on inner plates 270. But this configuration of conveying surfaces 330 can also be advantageous with respect to causing the flow of the fluid medium, i.e., for example, of an oil. For example, it may be possible in this way to cause a substantially radially outwardly directed flow of the fluid medium to first friction surfaces 230 and second friction surfaces 240.

The relevant plates 270, 250 or friction facings 260 which may be realized thereon can be formed in such a way that the flow of fluid medium can flow through them. To this end, the corresponding plates 250, 270 or the components communicating therewith can have channels or fluid channels which allow the fluid medium to flow through along radial direction. These channels or fluid channels can be formed in a straight line, for example, but can also be formed in curved lines and can run in the region of friction surfaces 230, 240. Accordingly, friction energy or heat released precisely in the region of the friction surfaces 230, 240 can be discharged in close proximity to the fluid medium and carried away because of the existing flow.

In the cross-sectional plane shown in FIG. 1, conveying surface 330 has a cross-sectional surface which in turn comprises a significant proportion of a cross-sectional surface of second volume 740 in the relevant cross-sectional plane. In order to enable a conveying action of conveying component 340 which is as high as possible but is suited to circumstances, it may be advisable in a clutch arrangement 100 to select the cross-sectional surface of first volume 720 in relation to the cross-sectional surface of conveying surface 330 such that it corresponds to at most 20 times, at most 15 times, at most 10 times, or at most 7.5 times the cross-sectional surface of conveying surface 330. It may even be possible to use even smaller factors in a clutch arrangement. Indeed it is also possible to provide at most 5 times, at most 3 times, or at most 2 times more conveying surface 330 than cross-sectional surface of first volume 720. Larger multiples than those mentioned above can also occur in other embodiment examples.

To allow a corresponding supply of fluid medium to conveying surface 330, pressing element 620 has in radial direction at the level of conveying surfaces 330 or closer to axis of rotation 300 a passage (not shown in FIG. 1), which is also referred to as opening bore or through-opening. The through-opening is arranged radially outwardly of sealing element 360, i.e., opens into first volume 720. Accordingly, fluid medium can enter first volume 720 through the through-opening (not shown in FIG. 1) and is transported in first volume 720 radially outward through friction surfaces 230, 240 through conveying surfaces 330 which may be rotating relative to the fluid medium. At the friction surfaces 230, 240, the flow of fluid medium enters a partial volume 730 of housing 110 in which vibration damper 420 is also arranged. In partial volume 730, the heat given off at the fluid medium can then be passed to other component parts, for example, housing 110. A portion of the fluid medium can then enter the first volume 720 again through the passage (not shown in FIG. 1) while a further portion of the fluid medium can exit partial volume 730 through bearing 550. The dividing wall 570 separates partial volume 730 from piston pressure space 590.

The conveying action of conveying component 340 is based not least of all on the fact that a flow is imposed on the fluid medium when there is a difference in rotational speed between conveying component 340 and the fluid medium. Accordingly, the conveying component can make use of a relative movement between drive component 150 and output component 190 via the above-described rotationally fixed connection. A relative movement of this kind presents itself particularly in the region of slip, i.e., when the first friction surfaces 230 and second friction surfaces 240 contact each other but have different rotational speeds. It is precisely in this situation that a significant amount of heat is generated in the region of friction surfaces 230, 240 which should be carried off via the fluid medium. When the rotational speeds are finally in equilibrium, i.e., when clutch arrangement 100 is engaged, substantially no new heat is generated so that it is not problematic if the conveying action subsides because of similarity of speeds between conveying component 340 on the one hand and the fluid medium on the other hand when it substantially rotates along with housing 110.

Sealing element 360 separates a second volume 740 from first volume 720. Further, second volume 740 is at least partially limited by a surface portion 750 of inner surface 220 of second housing shell 130 and of a rear piston face 760. Rear piston face 760 contacts a side of pressing element 620 remote of the piston surface 600.

If a pumping action is brought about due to a relative movement of conveying component 340 with conveying surfaces 330 thereof with respect to the fluid medium, there will be a drop in (static) pressure in first volume 720 due to hydrodynamic effects. However, since sealing element 360 separates first volume 720 from second volume 740, the pressure present in second volume 740 can be maintained substantially constant regardless of a possible conveying action of conveying component 340, but at least a pressure drop possibly occurring due to other effects can be limited. In this way, even during a relative movement or pumping action due to conveying component 340, a force acting on the rear piston face 760 is not substantially affected by the conveying action and, therefore, by the movement of conveying component 340.

In other words, through the use of sealing element 360, a pressure present in second volume 740 can be maintained more constant such that upon actuation of pressing element 620 changes in pressure in the second volume brought about by introducing liquid volume into piston pressure space 590 or removing a liquid volume therefrom and, therefore, changes in force on the rear piston face 760 can be substantially eliminated, but at least reduced. By keeping the corresponding force on the rear piston face 760 more constant, it is possible to improve an engagement behavior, disengagement behavior or a definition of a particular slip situation at friction surfaces 230, 240 by controlling pressing element 620. Thus it may be possible to improve a controllability of the clutch arrangement 100 according to one embodiment through the use of the corresponding sealing element 360.

Depending on the specific embodiment of sealing element 360, it may be possible to reduce the size of second volume 740 or to increase the size of second volume 740 by changing a radial position of sealing element 360. However, the actual size of first volume 720 can be much less crucial than a position and/or a size of a surface portion of pressing element 620 which at least partially limits second volume 740. During a rotation of clutch arrangement 100, centrifugal forces occur on the fluid medium located in second volume 740 and in piston pressure space 590. These centrifugal forces cause a pressure to build up which acts on pressing element 620 from both sides and which causes oppositely directed forces. Therefore, the radial position of sealing element 360 or the transitional area 790 thereof has an influence on whether or not an additional effective force is brought about on pressing element 620 due to the effect of centrifugal force because of changes in pressure, on the magnitude of this force and on the direction in which this force takes place.

For example, if transitional area 790 of sealing element 360 is displaced closer to axis of rotation 300 so that an extension of the surface portion of pressing element 620 along radial direction is reduced and second volume 740 is made smaller, the forces acting on pressing element 620 from second volume 740 are also smaller. Accordingly, a pressure acting in piston pressure space 590 due to centrifugal force leads to a greater effective force on pressing element 620 compared to the unaltered position of sealing element 360. The centrifugal forces occurring in piston pressure space 590 are therefore under-compensated.

Correspondingly, however, varying the location at which the transitional portion 790 is arranged also makes it possible to over-compensate for or substantially fully compensate for the centrifugal force pressure acting on pressing element 620. In this respect, it may be advisable that the pressure occurring in second volume 740 under the relevant circumstances due to centrifugal forces is dimensioned such that it is neither too large nor too small to impede or even prevent an engaging movement or disengaging movement of pressing element 620.

As has already been mentioned, sealing element 360 is further configured not only to fluidically separate first volume 720 from second volume 740, but is further configured to exert a force on pressing element 620 or another component having an at least partially disk-shaped portion such that pressing element 620 returns to its starting position when not actuated. In other words, sealing element 360 is configured in such a way that it exerts a force on pressing element 620 such that pressing element 620 is brought back to the starting position shown in FIG. 1 in which the frictional engagement between the first friction surfaces 230 and second friction surfaces 240 is canceled or at least decreased to the extent that no significant torque is transmitted via clutch arrangement 100. In this case, the actuation of pressing element 620 is carried out by introducing a corresponding fluid volume through the inlet bore 650 to piston pressure space 590.

To enable this dual functionality of sealing element 360, sealing element 360 has a first sealing surface 770 and a second sealing surface 780 which are connected to each other through a transitional portion 790. First sealing surface 770 and second sealing surface 780 are both oriented substantially perpendicular to axis of rotation 300 and spaced apart along the latter. The two sealing surfaces 770, 780 are also spaced apart along radial direction, i.e., perpendicular to axis of rotation 300, second sealing surface 780 being arranged radially inwardly of first sealing surface 770 in the sealing element 360 shown in FIG. 1. Accordingly, transitional portion 790 has a conical outer surface shape. The arrangement of the two sealing surfaces 770, 780 along radial direction can also be switched in other embodiment examples.

The two sealing surfaces 770, 780 lie on corresponding planes or annular portions of housing 110 or second housing shell 130, respectively, and pressing element 620. Depending on the specific embodiment, these sealing surfaces 770, 780 may be surface-treated, i.e., for example, turned, to form corresponding counterpart sealing surfaces.

When a deformation of sealing element 360 is brought about due to a movement of pressing element 620, this results, not least, in a deformation of transitional portion 790, and there is initially a tendency for an area-type support because of the flat configuration of the two sealing surfaces 770, 780 even in the event of a deformation of the same or a change in the geometrical orientation of the same relative to pressing element 620 and second housing shell 130. However, a lifting off or rolling off of at least a portion of one of the two sealing surfaces 770, 780 can also come about depending on the degree of deformation of sealing element 360. In this case, it may come about that the relevant sealing surfaces 770, 780 only contact the corresponding component part, i.e., pressing element 620 or second housing shell 130, in a line-shaped manner at least in some areas, but possibly also in all areas. Typically, however, there is always at least one line-shaped contacting area. Accordingly, even in case of a movement of pressing element 620, a sealing action of sealing element 360 can be at least partially maintained. Moreover, to better secure sealing element 360 to second housing shell 130, sealing element 360 has at a side remote of transitional portion 790 a portion which is adapted to a shape of second housing shell 130 so that in this way a positive engagement connection is formed in radial direction and in axial direction, i.e., along axis of rotation 300.

This positive engagement connection may also be configured only as an aid to assembly or as a centering aid for sealing element 360. In addition or alternatively, the portion, also referred to as collar or edge, can also be provided for mechanical stabilization of sealing element 360. Accordingly, a deformation of sealing element 360 in circumferential direction during a displacement of pressing element 620 along axis of rotation 300 may be reduced or completely prevented by this portion. For example, corrugations along the circumferential direction can occur under corresponding loads. Also, the shapes of sealing element 360 and of second housing shell 130 need not be adapted in the manner described above.

Accordingly, in the embodiment example of a clutch arrangement 100 shown in FIG. 1, sealing element 360 serves not only for the fluidic separation of first volume 720 and second volume 740, but also carries out the additional function of returning pressing element 620 to a starting position before an actuation of the same so that clutch arrangement 100 is, in particular, a normally open clutch arrangement. Sealing element 360 may also be reinforced where applicable by a further corresponding spring element, for example, in the form of a supplementary disk spring, diaphragm spring, leaf spring or coil spring.

In other embodiment examples, sealing element 360 can also exert a force on pressing element 620, or another component part, such that clutch arrangement 100 is a normally closed clutch arrangement in which there is a frictional engagement between first friction surfaces 230 and second friction surfaces 240 without an actuation. In other words, sealing element 360, which is also referred to as sealing plate, can be not only pre-loaded in compression as is shown in FIG. 1 but also pre-loaded in tension. In this way, a normally closed clutch arrangement can be realized, for example.

The clutch arrangement 100 shown in FIG. 1 is a three-line type in which the inlet bore 650 is one of the three lines or channels using which piston pressure space 590 can be charged with the fluid medium, possibly also with a different fluid medium. To enable a movement of pressing element 620, second volume 740 is fluidically connected via a feed channel 800, shown in dashes in FIG. 1, which leads into a feed 810 to second volume 740. In this case, feed channel 800 opens into an inlet region 820 which is guided along the transmission input shaft (not shown in FIG. 1). Feed channel 800 and feed 810 allow the fluid medium to flow in and out when there is a movement of pressing element 620. Accordingly, they serve to compensate for the corresponding volume.

Inlet region 820 is connected to an inlet for the fluid medium, i.e., for the oil or transmission oil, via several tooth voids in the internal toothing 210 and corresponding external toothing of the transmission input shaft. One, two, or more adjacent teeth are frequently omitted in the region of internal toothing 210 and the corresponding external toothing of the transmission input shaft (not shown in FIG. 1) at a plurality of locations along the circumference of the corresponding teeth so that oil passage conduits are formed at these locations which fluidically couple the inlet region with the transmission. Specifically, two adjacent teeth are missing from the relevant toothing at three locations in the embodiment example shown in FIG. 1 to form the oil passage conduits.

Not only is second volume 740 supplied with fluid medium via inlet region 820, but partial volume 730 is also fluidically connected via inlet region 820 and oil guide conduits integrated in bearing 565. In other words, the oil flows in through internal toothing 210 and the corresponding external toothing of the transmission input shaft, inlet region 820 and the oil guide channels of bearing 565. The inlet bore 650 to piston pressure space 590 is separated from inlet region 820 by a seal, also not shown in FIG. 1. Accordingly, inlet region 820 constitutes the second line.

The fluid medium can exit partial volume 730 via corresponding oil guides or oil guide channels in bearing 550 and an outlet region 830. Outlet region 830 is formed between lower hub 200 and a pump hub 840 and has a substantially annular cross section. Pump hub 840 is sealed relative to lower hub 200 using a sealing element 850. The fluid medium which has entered outlet region 830 can then be discharged via an opening 860, also referred to as oil discharge. In the clutch arrangement 100 shown in FIG. 1, the opening 860 is connected to the sump of the transmission or also to another receptacle for the oil or fluid medium. Accordingly, together with outlet region 830, opening 860 forms the third line.

In many cases, the conveying volume which can be circulated through conveying component 340 with its conveying surfaces 330 in the interior of housing 110 is many times greater than a volume which is supplied to and removed from housing 110 via inlet region 820 and outlet region 830, respectively. Accordingly, a volume flow is often generated using conveying surfaces 330 of conveying component 340, but also using other structures in the interior of housing 110 which assist in conveying the fluid medium.

This volume flow can be at least five times, at least ten times, at least fifteen times, or at least twenty times the volume of fluid medium made available through inlet region 820 of clutch arrangement 100, but may also be smaller than these values. The ratios indicated in this respect refer to a maximum amount conveyed by conveying component 340. These conveying surfaces 330 generating a forced flow in the respective housing 110 which is filled with fluid and which rotates around the axis of rotation make use of precisely the effect of different rotational speeds at the drive side and driven side of clutch arrangement 100, i.e., the different rotational speeds at drive component 150 and output component 190. Conveying surfaces 330 act like an impeller with respect to the circulation of the fluid medium or like a turbine in a hydroclutch or hydrodynamic torque converter.

Pump hub 840 is connected to first housing shell 120 of housing 110 via a weld 870. Second housing shell 130 is also connected to front hub 580 via a weld 880 so that, in connection with weld connection 140 which may be formed, for example, as a weld seam and connects the two housing shells 120, 130, a closed volume is formed with partial volume 730 and with first volume 720 and second volume 740.

The corresponding welds 870, 880 and 140 can be formed as weld seams or as spot welds. These connection techniques can also possibly be exchanged for other connection techniques which are adapted and suited to the conditions of use.

FIG. 1 further shows a balance weight 890 which is welded to first housing shell 120 in the present case. It serves to compensate for imbalances induced by design or assembly or from other causes and can thus reduce corresponding imbalances in the drivetrain of the vehicle. However, the position of the balance weight shown in FIG. 1 can vary in other embodiment examples.

Further, a spacer disk 900 is inserted between the feed 810 formed as part of front hub 580 and the housing 110, more accurately the second housing shell 130. As will be described briefly in the following, this spacer disk 900 serves to adjust a clearance between the plates, i.e., to adjust the clearance between first friction surfaces 230 and second friction surfaces 240. The clearance between friction surfaces 230, 240 determines the capacity of clutch arrangement 100 to interrupt the torque flow on the one hand and a response behavior during engagement and disengagement of clutch arrangement 100 on the other hand.

While clearances S tending to be larger are specified in the interest of a reliable separation of friction surfaces 230, 240 and, therefore, in the interest of a reliable separation of the torque flow, these clearances S must be bridged by pressing element 620 in case of engagement and disengagement. Accordingly, it is precisely during a controlled engagement of clutch arrangement 100 that a delayed formation of the frictional engagement can come about, since the clearance must be bridged by pressing element 620 beforehand. Therefore, an adjustment of the clearance of the plates may improve a relationship between a response behavior of the clutch on the one hand and wear of first friction surfaces 230 and second friction surfaces 240 and a separability of clutch arrangement 100 on the other hand.

To this end, clutch arrangement 100 according to one embodiment has the spacer disk 900 which was described above. Spacer disk 900 can be adapted—within corresponding acceptable tolerance ranges—to the respective component dimensions of inner plates 270, outer plates 250, friction facings 260 and the other components which may be provided and which have an influence on the plate clearance S. In this respect, the plate clearance can be carried out based on previously measured component dimensions as well as in the course of a (partial) assembly of clutch arrangement 100 and a corresponding determination or measurement of the plate clearance along axis of rotation 300.

When the plate clearance S has been determined in one of the ways described above, an appropriate spacer disk 900, for example, from a set of ready-made spacer disks, can then be inserted. This spacer disk may also be machined individually. After insertion of the corresponding spacer disk 900, housing 110 of clutch arrangement 100 can then be closed, for example, by the welds 870, 880, 140 shown in FIG. 1, after assembly is finished.

Further, spacer disk 900 can also be implemented as a two-part or multi-part solution. In the two-part or multiple-part solution of the spacer disk, this spacer disk can comprise a first spacer disk component part and a second spacer disk component part which at least partially have a wedge-shaped profile along the circumference thereof. In this way, by rotating the two spacer disk component parts relative to each other, a thickness of the spacer disk along axis of rotation 300, i.e., along axial direction, can be changed by rotating the two parts relative to each other.

By inserting a two-part or multiple-part spacer disk of this kind, i.e., a spacer disk 900 with a plurality of spacer disk component parts, the plate clearance S between friction surfaces 230, 240 can be adjusted by rotating second housing shell 130 relative to front hub 580 in case of the installed position of spacer disk 900 shown in FIG. 1.

In the embodiment example of a clutch arrangement 100 shown in FIG. 1, second housing shell 130 has a planar portion 910 at an outer surface of housing 110 to which the weld bolt is fastened for fastening clutch arrangement 100 or for fastening housing 110 to a flexplate of an engine or other drive unit. To this end, weld bolt 160 is connected to the planar portion 910 of housing 110 by a weld 920. However, housing 110 or second housing shell 130 has at the inner surface 220 facing the inner volume a recess 930 in this area so that second housing shell 130 has a smaller material thickness in this area than in other areas. This makes it possible to configure the support 390 for outer plates 250 in such a way that support 390 projects into recess 930. In this way, outer plate 250-1 can also be constructed as a planar disk without the risk of portion 370-1 or further driver surface 380-1 contacting housing 110 even under adverse operating conditions. Accordingly, an outer plate 250-1 identical to outer plate 250-2 can be used without having to take special measures in the area of portion 370 or allow for other features of the design thereof.

A recess 930 of this type which is located opposite a planar portion 910 at housing 110 can be carried out, for example, by providing a so-called S-stroke in the area of second housing shell 130. The S-stroke can be provided along the entire circumference, whereas planar portion 910 can be restricted to narrow spatial areas along the circumferential direction in which a connection to weld bolt 160 is to be made. Once the S-stroke has been introduced in second housing shell 130, planar portion 910 can be provided by pressing in second housing shell 130 in the area of the planar portion 910 to be generated. The material penetrating into the interior of housing 110 in so doing, i.e., the material penetrating the inner surface 220 of second housing shell 130, can then be removed, for example, by turning or by some other cutting method, to form recess 930.

The step, described with reference to FIG. 1, of generating planar portion 910 for receiving weld bolt 160 or another stud for fastening the clutch arrangement to a drive unit or other unit may be useful or necessary, for example, in a clutch arrangement 100 in which a particular position of the drivetrain or components thereof is necessary. The clutch arrangement 100 shown in FIG. 1, for example, is one determined for transverse installation, i.e., for mounting transverse to the longitudinal axis of the vehicle. However, embodiment examples of a clutch arrangement of this type are in no way limited to such clutch arrangements. On the contrary, they can also be utilized for longitudinally installed engines and gear units.

Merely in the interest of thoroughness, it should be mentioned here again that pressing element 620 is not coupled with housing 110 by a positive engagement connection. That is, if the non-positive or frictionally locking connection brought about by nose 690 and other components is overcome, pressing element 620 is "freely" rotatable relative to housing 110. A situation of this kind can occur, for example, when there is an abrupt change in rotational speed without a renewed engagement of clutch arrangement 100. Examples of this include braking the vehicle to a standstill (standstill of the output component 190) starting from a high engine speed, to name only one example. In a situation of this kind, the free rotatability of pressing element 620 may lead to noise development from the region of clutch arrangement 100, which may be perceived by the driver as annoying, for example.

Figure 2:
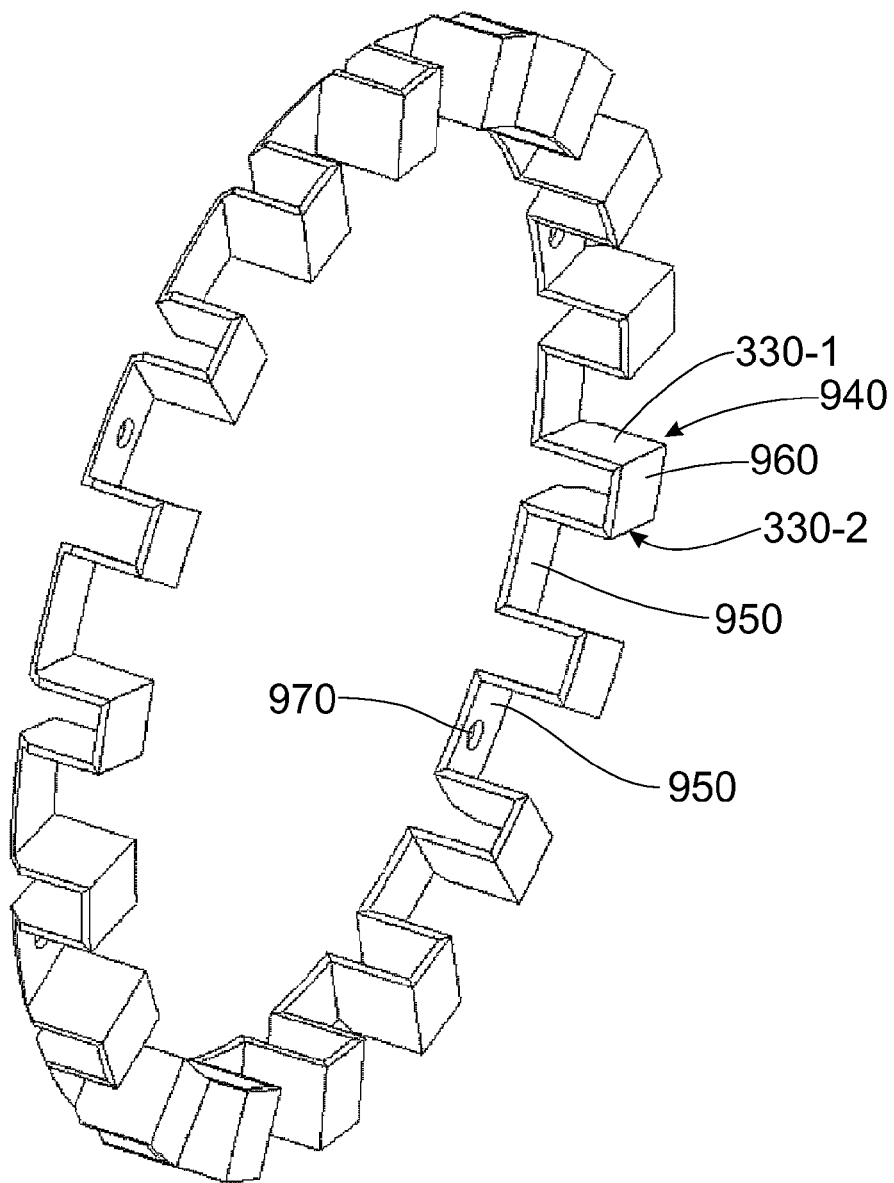
FIG. 2 shows a perspective view of a conveying component of a clutch arrangement in accordance with one embodiment of the present invention.

FIG. 2 shows a three-dimensional view of conveying component 340 as it is used in clutch arrangement 100 in FIG. 1. Conveying component 340, also referred to as plate driver, is constructed substantially as a complete ring, i.e., annularly. Conveying component 340 has a plurality of teeth 940 which are uniformly arranged along the circumference of conveying component 340 and which project above ring-segment-shaped portions 950 of conveying component 340. Teeth 940 are arranged at regular, equally spaced intervals.

Each of the teeth, only one of which is identified by a reference numeral in FIG. 2, has substantially two tooth flanks which extend perpendicular to portion 950 and form conveying surfaces 330. In the tooth identified in FIG. 2 as tooth 940, the two conveying surfaces 330-1 and 330-2 are joined to each other by a top surface 960.

As has already been mentioned in connection with FIG. 1, conveying component 340 in the embodiment example shown therein is connected to housing 110, i.e., to the cover of clutch arrangement 100, via rivet connection 350. For guiding the rivet, conveying component 340 has at some portions 950 corresponding openings 970 through which the rivet connection to housing 110 or second housing shell 130 is provided. Specifically, the conveying component shown in FIG. 2 has a total of six openings 970 which are evenly distributed along the circumference of conveying component 340. In other embodiments, a different quantity of openings 970 can be implemented and can be arranged in an evenly or irregularly distributed manner.

In this case, conveying component 340 is formed integral, i.e., is fashioned from exactly one contiguous piece of material. Apart from the starter material piece and the openings 970, conveying component 340 has been produced by deforming a sheet-like workpiece. Accordingly, a comparatively simple and, therefore, inexpensive production method can be used. In other embodiment examples in which the requirements may be more exacting with respect to loads or for other constraints, a different production method may appear more reasonable, and cutting production methods or casting production methods can be used to provide the corresponding conveying component 340.

As an alternative to the construction shown in FIG. 2, a conveying component 340 can also be implemented based on a plurality of conveying component segments which can be formed in one piece in each instance, for example. However, regardless of the exact implementation of conveying component 340 in the embodiment example shown in FIG. 1, this conveying component 340 may combine the functionality of furnishing a flow of fluid medium, i.e., oil, for example, with the driving of inner plates 270 using collective use of conveying surface 330. In this way, the driving of plates 270 can be implemented in a wet clutch without having to provide an additional plate carrier for the relevant inner plates 270. In this case, conveying component 340 simultaneously carries out the additional function of vanes for generating the internal oil circulation. Clutch arrangements 100 according to one embodiment can be implemented as multiplate clutches or as single-disk clutches.

In the multiplate clutch arrangement 100 shown in FIG. 1, the driving of plates 270 is realized using the meander-shaped element, namely, conveying component 340. As is shown in FIG. 2, conveying component 340 can be implemented as a one-part solution or as a plurality of segments. In this case, conveying surfaces 330 generate the internal oil circulation, but serve at the same time to drive the plates.

As was shown in FIG. 1, conveying component 340 can be arranged on the engine side at the cover of the housing, i.e., at second housing shell 130, using rivets or other connection techniques to transmit the torque of the engine to plates 270. Accordingly, the embodiment example shown in FIG. 1 is a clutch arrangement 100 in which the plate driver is arranged at the cover side. Indeed, clutch arrangements 100 could also be put to use for high torques of several hundred newton meters (Nm), but clutch arrangements 100 according to embodiment examples in which higher or lower maximum torques can be transmitted can also be implemented.

Figure 3:
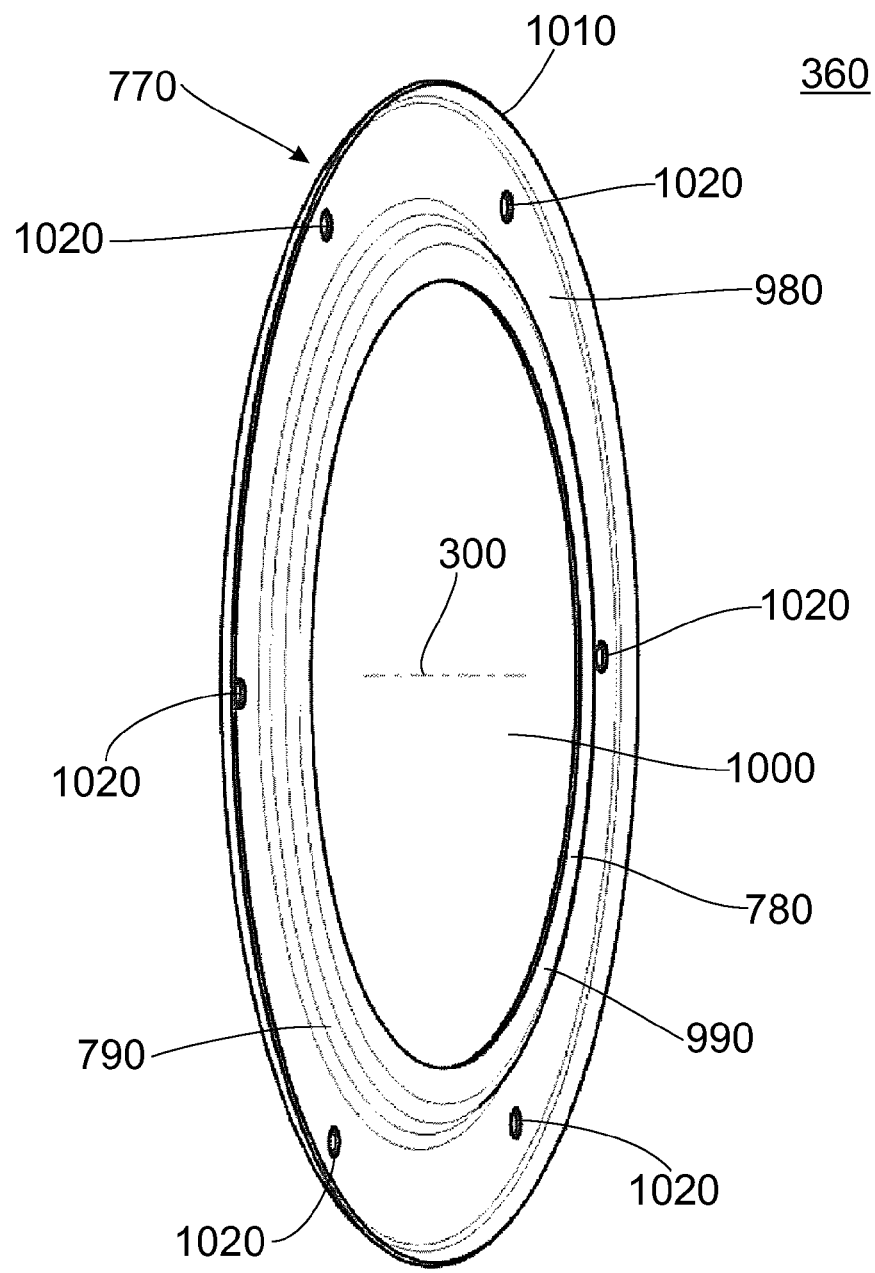
FIG. 3 shows a perspective view of a sealing element in accordance with one embodiment of the present invention such as can be used in a clutch arrangement in accordance with one embodiment of the present invention.
Figure 4:
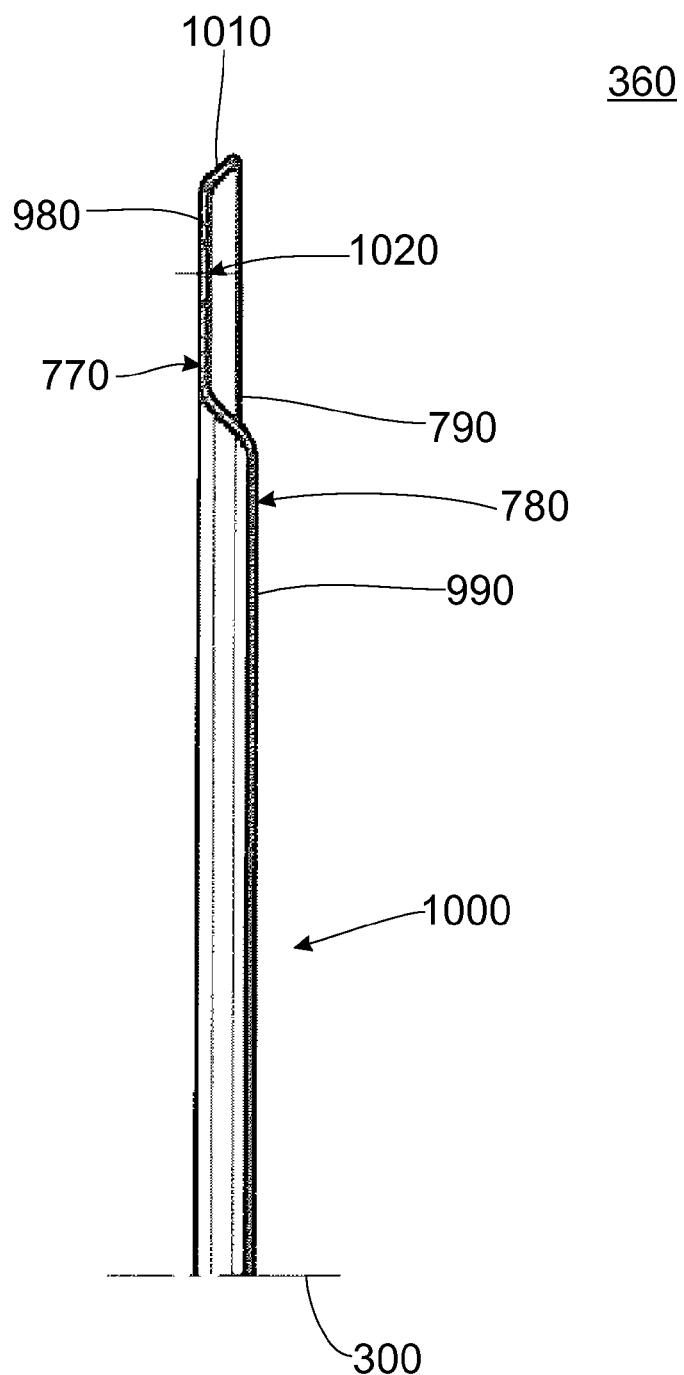
FIG. 4 shows a cross-sectional view of the sealing element shown in FIG. 3.

FIG. 3 shows a perspective view of sealing element 360 as used in the clutch arrangement 100 shown in FIG. 1. FIG. 4 shows a corresponding cross section through sealing element 360. Sealing element 360 comprises a disk-shaped first portion 980 comprising first sealing surface 770 at a surface of sealing element 360 not shown in FIG. 3.

Sealing element 360 further comprises a disk-shaped second portion 990 which comprises second sealing surface 780 or which is formed at a surface of second portion 990. The two portions 980, 990 are oriented substantially perpendicular to axis of rotation 300, i.e., to the axial direction of clutch arrangement 100. The two portions 980, 990 are arranged along the axis of rotation to be spaced apart axially and radially offset perpendicular to the axis of rotation. First portion 980 is arranged along the radial direction completely outside of second portion 990. In other embodiment examples, a different arrangement can also be implemented, for example, with a partial overlap along radial direction and/or swapped arrangement of the first portion and second portion.

First portion 980 and second portion 990 are connected to each other by transitional portion 790. Owing to the radial and axial offset of the two portions 980, 990, this transitional portion 790 extends substantially obliquely relative to axis of rotation 300 but forms a truncated cone-shaped surface of sealing element 360 due to the substantially rotationally symmetrical configuration of sealing element 360. Further, sealing element 360 has a central recess 1000 which is arranged symmetrically with respect to axis of rotation 300. Second portion 990 limits the central recess 1000 outwardly.

Sealing element 360 further has at an edge of first portion 980 an edge structure 1010 having a shape that is adapted to the shape of second housing shell 130 and accordingly generates an at least partially positive engagement connection along radial direction and axial direction, i.e., along axis of rotation 300, through which sealing element 360 can be aligned during assembly. Edge structure 1010 is arranged at an angle of about 40° to first portion 980 and second portion 990, but different angles can also be implemented in other embodiment forms. Edge structure 1010 can also be configured differently or can be omitted. Alternatively or in addition, edge structure 1010 can also serve to mechanically stabilize sealing element 360, which imparts a greater dimensional stability to sealing element 360 during deformation. For example, a corrugation in circumferential direction can occur in the region of first sealing surface 770 when pressing element 620 is actuated. Accordingly, the shape of edge structure 1010 can also deviate from that of second housing shell 130. Edge structure 1010 can also be constructed differently in other embodiment examples and/or a corresponding deformation can be prevented or reduced through other structural measures.

Further, in the embodiment example of a sealing element 360 shown in FIGS. 3 and 4, a plurality of holes 1020 are provided in first portion 980 using which sealing element 360 can be fastened to the relevant counterpart component, i.e., second housing shell 130 in the present instance. Holes 1020 are provided for producing a plug-in connection and/or rivet connection. It is these holes 1020 which make it possible to produce the rivet connection 350 with second housing shell 130, i.e., housing 110, shown in FIG. 1.

In this case, transitional portion 790 which connects first portion 980 and second portion 990 to each other contributes not least to the springing action or spring functionality of sealing element 360 which was described above. Because of the fastening of sealing element 360 to first sealing surface 770 at second housing shell 130 and the contact of second sealing surface 780 at the relevant counterpart component or other component, in this case pressing element 620, transitional area 790, not least, is deformed during an axial movement of pressing element 620. Therefore, this transitional area 790 significantly provides the above-described spring force.

The opportunity presents itself at this point to mention merely in the interest of thoroughness that the arrangement of first sealing surface 770 and second sealing surface 780 as shown in FIG. 3 can also be carried out differently in other embodiment examples of a sealing element 360. For example, the first sealing surface 770 and second sealing surface 780 can be oriented parallel to a surface normal rather than being arranged at opposite sides of sealing element 360. The corresponding sealing surfaces 770 780 can also be swapped with respect to their orientation along axis of rotation 300.

As is shown in FIGS. 3 and 4, sealing element 360 can replace a lip seal and a disk spring, for example. This not only simplifies the production of a clutch arrangement 100 according to one embodiment but also makes it possible where applicable to save installation space in the interior of clutch arrangement 100 and enables a more compact construction of the latter. Accordingly, the installation space for a lip seal or an additional compensation space can be economized.

Where appropriate, the disk spring, diaphragm spring or leaf spring can also be omitted, or the functionality thereof can also be implemented in case of a clutch arrangement 100 when no installation space would actually be available for it but its functionality would be advantageous. Thus a sealing element 360 according to one embodiment can also be used as a return spring.

A difference in pressure between the piston space or piston pressure space 590 and the adjacent volume, in the present case second volume 740, arising as a result of a rotating movement or relative rotational movement can also be reduced through the use of sealing element 360. In other words, an increase in centrifugal force pressure in piston pressure space 590 caused by a rotation of clutch arrangement 100 may be reduced or compensated.

Figure 5:
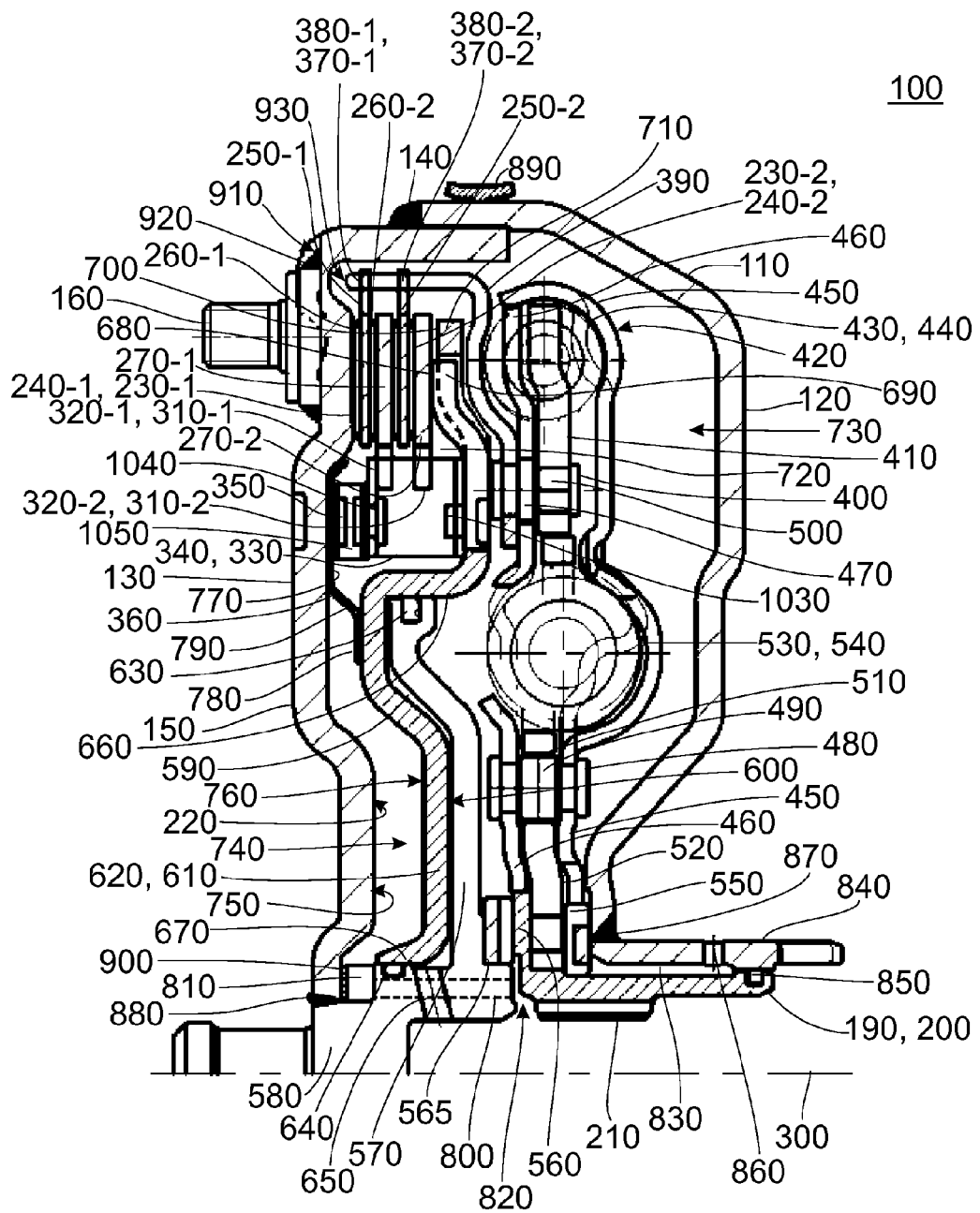
FIG. 5 shows a cross-sectional view through a further clutch arrangement in accordance with one embodiment of the present invention.

FIG. 5 shows a corresponding overall system of clutch arrangement 100 according to one embodiment, but in which conveying component 340 is fastened on the piston side.

Accordingly, while the clutch arrangement 100 according to one embodiment shown in FIG. 5 still also has a sealing element 360, it is no longer directly connected to conveying component 340 via rivet connection 350 which connects sealing element 360 to second housing shell 130 (cover). Rather, conveying component 340 is connected to pressing element 620 via a rivet connection 1030 by positive engagement and, therefore, to be fixed with respect to rotation relative to it. Accordingly, for example, conveying component 340 can be connected by positive engagement to a plurality of leaf spring elements 1050 via further rivet connections 1040, these leaf spring elements 1050 being implemented as part of sealing element 360. Accordingly, conveying component 340 presents an example of a further component part which is coupled with drive component 150 indirectly via sealing element 360 in a substantially rotationally fixed manner.

Leaf spring elements 1050 are formed out through a shaping of the material of sealing element 360 and are therefore fashioned integral with it. In other embodiment examples, however, leaf spring elements 1050 can also be fashioned as separate components or using other production methods in case they are formed integral with sealing element 360.

Since sealing element 360 is connected to the cover, i.e., second housing shell 130, to be fixed with respect to rotation relative to it via rivet connection 350, a substantially rotationally fixed connection results between the housing 110 serving as drive component 150 and the pressing element 620. In this case, therefore, sealing element 360 is also a connection component. Accordingly, compared with the clutch arrangement 100 shown in FIG. 1, pressing element 620 is no longer "freely" rotatable but is connected to housing 110 in a substantially positively engaging manner. Therefore, even when there is an abrupt change in rotational speed without renewed engagement of clutch arrangement 100, a corresponding development of noise due to a freely rotating pressing element 620 will not occur in this implementation.

The connection between pressing element 620 and housing 110 can only be substantially rotationally fixed because torsion can occur between pressing element 620 and housing 110 due to, e.g., deformations, thermal effects or because of the geometric relationships given by the leaf spring elements 1050 during an axial displacement of pressing element 620. However, regardless of this, pressing element 620 follows the rotational movement of housing 110 in the embodiment example shown herein.

Accordingly, in the variant shown in FIG. 5, conveying component 340 is arranged on the piston side, a connection to the second housing shell 130 serving as cover being carried out using leaf spring elements 1050 to transmit the torque of the engine to inner plates 270 via conveying surface 330. The leaf springs or leaf spring elements 1050 accordingly provide the connection of conveying component 340 to the engine-side second housing shell 130. The leaf spring elements 1050 project into first volume 720 so that during a rotation of housing 110 and, therefore, during a rotation of conveying component 340 relative to the fluid medium in the interior of housing 110, these leaf spring elements 1050 likewise reinforce the conveying of fluid and, therefore, the generation of the flow of the fluid. Leaf spring elements 1050 also reinforce the conveying of oil.

Whereas, for the most part, rivet connections 1030, 1040, 350 were discussed heretofore, other connection techniques can also be used to produce the corresponding substantially rotationally fixed connection between housing 110 and conveying component 340. For example, the corresponding rivet connections can also be individually or collectively replaced by or supplemented by a different connection technique, for example, a plug-in connection, but also by other positive, frictional and/or bonding connections.

In a corresponding embodiment example, the use of leaf spring elements 1050 can also be substituted by other components provided that they also reinforce, or at least do not hinder, an axial displacement of pressing element 620, i.e., along axis of rotation 300.

Accordingly, a clutch arrangement 100 allows a driving of plates while simultaneously providing a vane function for a fluid medium which can be located in housing 110 of clutch arrangement 100. Clutch arrangements 100 can accordingly be provided for different clutch applications, for example, for vehicles with automatic transmissions installed in the front area of the vehicle and constructed transverse to the driving direction. Clutch arrangements 100 according to one embodiment may be used as starting clutches, but also as separating clutches in connection with synchronized transmissions or in connection with longitudinally installed engines. Oil may serve as fluid medium, for example.

Figure 6:
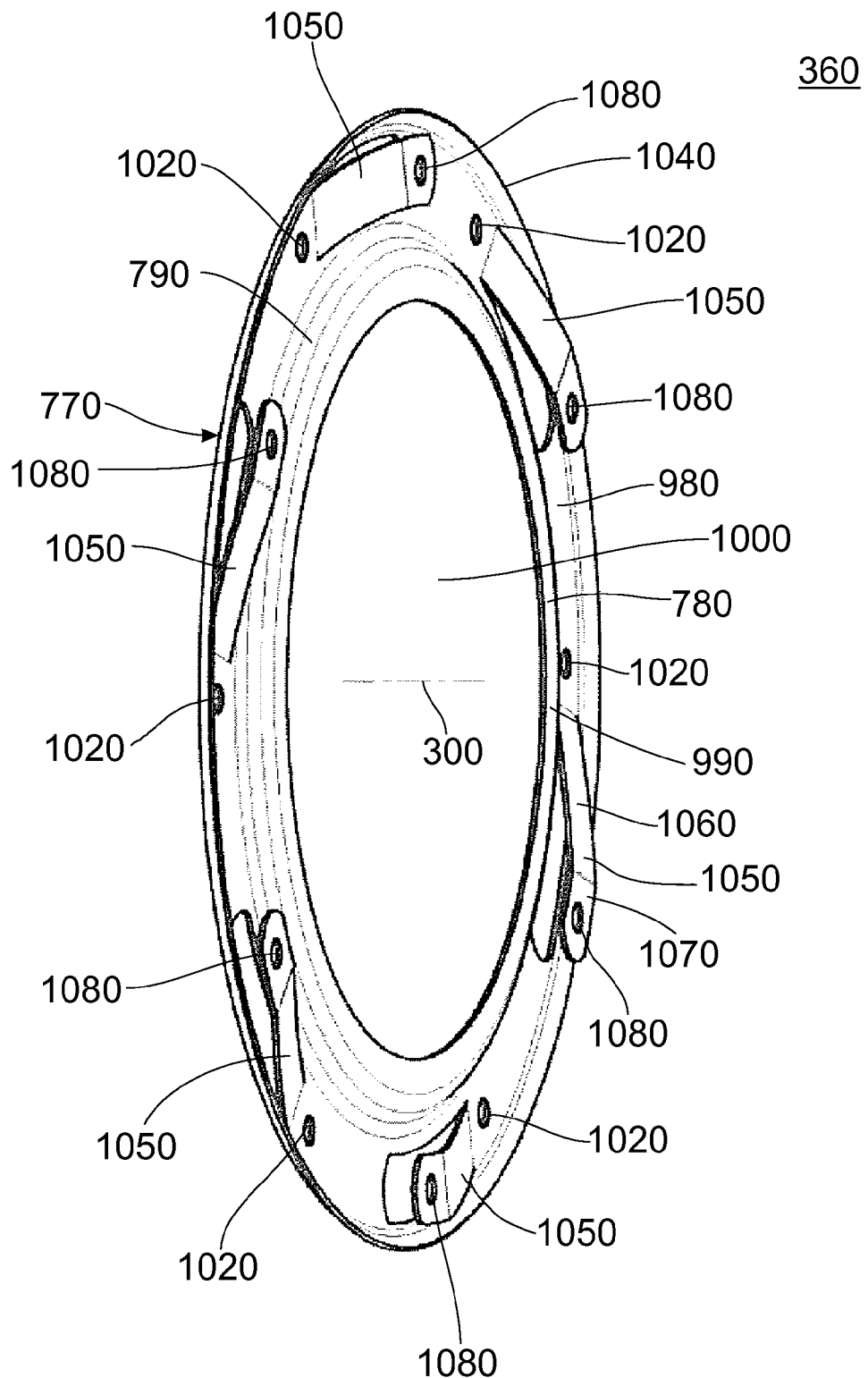
FIG. 6 shows a perspective view of a further sealing element in accordance with one embodiment of the present invention such as can be used, for example, in the clutch arrangement according to the embodiment shown in FIG. 5.
Figure 7:
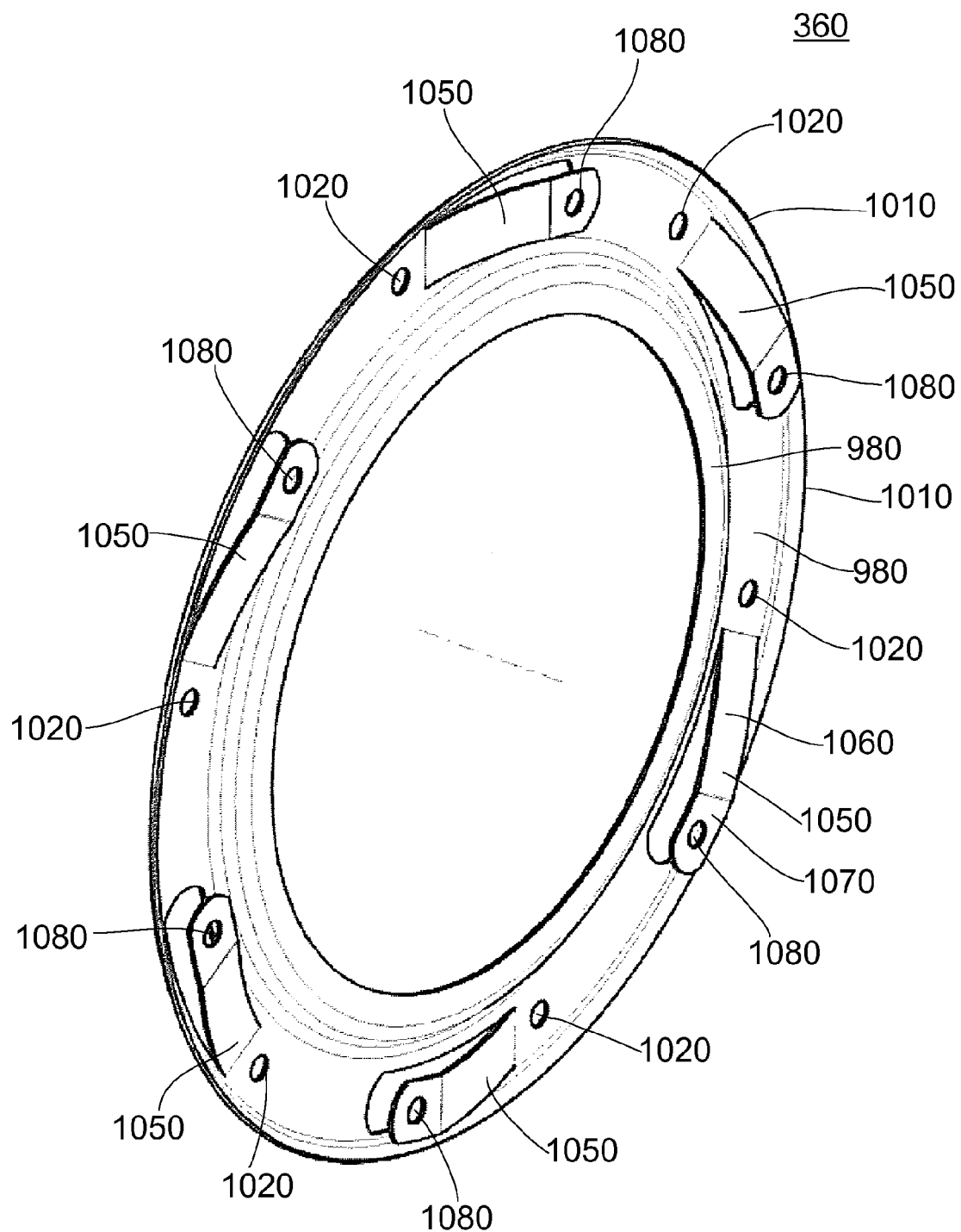
FIG. 7 shows a further perspective view of the sealing element shown in FIG. 6.
Figure 8:
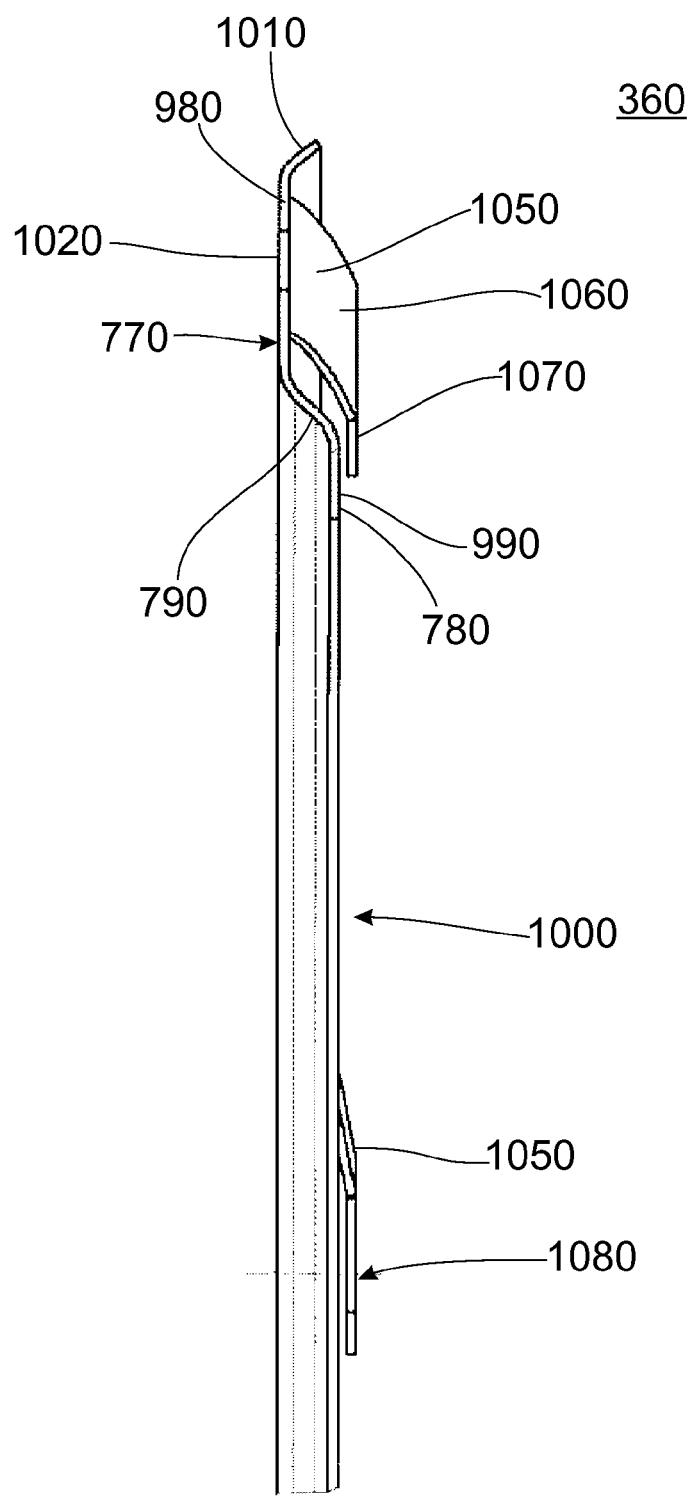
FIG. 8 shows a cross-sectional view through the sealing element shown in FIGS. 6 and 7.

FIGS. 6 and 7 show perspective views of sealing element 360 according to one embodiment as is implemented in the clutch arrangement 100 from FIG. 5. FIG. 8 shows a cross section through sealing element 360 corresponding to FIG. 4.

As has already been mentioned, the sealing element 360 of FIGS. 6 to 8 differs substantially from the sealing element 360 described heretofore in that a plurality of leaf spring elements 1050 allowing torque to be transmitted via sealing element 360 are now implemented in the first portion 980. Leaf spring elements 1050 are realized in this instance as a shaping out of the sheet-like material from which sealing element 360 is also fashioned. In order to allow the leaf spring elements to contact the relevant further component, i.e., for example, conveying component 340, leaf springs 1050 have in each instance a spring portion 1060 extending obliquely with respect to axis of rotation 300 and a fastening portion 1070. The fastening portion is oriented substantially parallel to first portion 980 and second portion 990 and, therefore, to the two sealing surfaces 770, 780.

To provide the substantially rotationally fixed connection via sealing element 360, leaf spring elements 1050 have in the fastening portions 1070 thereof, respectively, a hole 1080 which can be utilized for generating a positive engagement connection between sealing element 360 and the corresponding further component part, i.e., in the present instance, conveying component 340. Accordingly, as was also shown in FIG. 5, hole 1080 was used to produce the further rivet connection 1040. Alternatively or in addition, holes 1080 can also be utilized for providing a plug-in connection.

FIGS. 6 to 8 show a sealing plate with integrated leaf springs, wherein FIGS. 6 and 7 show three-dimensional views and FIG. 8 shows the corresponding sealing plate with the leaf springs in section. The integration of the leaf springs or leaf spring elements 1050 allows torque to be transmitted from the cover arranged on the engine side, i.e., from second housing shell 130, to pressing element 620 or also allows the driving of plates which is realized in the present embodiment example by conveying component 340.

Other forms of torque transmission may be implemented in other embodiment examples. Naturally, it is also possible to use leaf spring elements 1050 which are formed out in different ways, for example, in which spring portion 1060 and fastening portion 1070 are implemented differently, possibly without the corresponding holes 1080. It may also be possible, for example, to initially form leaf spring elements 1050 at an outer diameter or inner diameter of sealing element 360 and, for example, to deform them inward by more than 120° in the course of bending. It may also be possible to implement the corresponding transmission of torque via frictional engagement.

Embodiment examples of a sealing element 360 can bring about compensation of centrifugal forces at pressing element 620. To this end, in the interior of pressing element 620 according to one embodiment, sealing element 360 can separate a centrifugal force compensation space, i.e., second volume 740, from first volume 720 in the existing installation space. Second volume 740 which adjoins rear piston face 760 of pressing element 620 constitutes the centrifugal force compensation space based on this geometrical arrangement.

By adjusting the diameter between the cover arranged on the engine side and the sealing plate, centrifugal force pressure can be compensated to any degree in principle. Accordingly, by shifting the transitional area to smaller radius values, second volume 740 can be reduced in size so that a force acting on pressing element 620 is reduced when pressure occurs as a result of centrifugal force acting on the fluid medium located in second volume 740. However, this may be counteracted by a pressure occurring in piston pressure space 590 resulting in an under-compensation of the centrifugal force pressure. On the other hand, a corresponding enlargement of second volume 740 can be achieved by shifting the transitional area to greater radii so that the corresponding forces acting on pressing element 620 are increased from this side. By adjusting the sealing diameter between the engine-side cover (second housing shell 130) and the sealing plate or sealing element 360, the centrifugal force pressure can be fully compensated, but at least over-compensated or under-compensated.

Further, the sealing plate or sealing element 360 can also take over the function of a return spring, and an adjustment of the return spring force can be carried out by a suitable choice of the diameter or radius transitions and further geometry-dependent parameters of sealing element 360. A material thickness of the sealing element as well as other factors can also influence the return spring force. An embodiment of a sealing plate 360 can be seen in the interior of a clutch arrangement 100 according to an embodiment example possibly as a plate between pressing element 620 and the engine-side cover, i.e., second housing shell 130.

The embodiment examples described in the preceding merely serve as an illustration of the principles of the present invention. It will be appreciated that modifications and variations of the arrangements and details described herein will be apparent to those skilled in the art. Therefore, it is intended that the invention be limited only by the protective scope of the appended patent claims and not by the specific details set forth herein in the description and explanation of the embodiment examples.

The invention claimed is:

1. A clutch arrangement for a drivetrain of a vehicle, comprising:
   a first friction surface;
   a second friction surface coupled to an output component of the clutch arrangement to be substantially fixed with respect to rotation relative to the output component, wherein the first friction surface and the second friction surface are configured and arranged to be brought into frictional engagement with each other to make a torque transmittable from the first friction surface to the second friction surface, and wherein the first friction surface and the second friction surface are further configured to be exposed to a fluid medium during an operation of the clutch arrangement;
   a pressing element configured to produce or sever the frictional engagement by causing a force along a force direction when actuated;
   a sealing element configured to separate a first volume in which the first friction surface and the second friction surface are arranged from a second volume, wherein the sealing element is arranged along a force direction between the pressing element and a housing of the clutch arrangement; and
   a conveying component in the first volume, wherein the conveying component is coupled with the housing to be substantially fixed with respect to rotation relative to the housing and is configured to cause a flow of the fluid medium during a rotation relative to the fluid medium.

2. The clutch arrangement of claim 1, wherein the pressing element is further configured to cause the force along a force direction through a movement along the force direction, and wherein the sealing element is configured to be deformable such that the sealing element can yield to a movement of the pressing element along a force direction by a deformation thereof.

3. The clutch arrangement of claim 1, wherein the second volume is at least partially limited by a surface portion of the pressing element.

4. The clutch arrangement of claim 3, further comprising a piston pressure space that adjoins a side of the pressing element remote from the second volume, wherein an extension of the surface portion of the pressing element along a radial direction of the clutch arrangement differs from an extension of the piston pressure space along the radial direction by at most 30% of the greater extension of the surface portion of the pressing element and of the piston pressure space.

5. The clutch arrangement of claim 1, wherein the pressing element is configured such that the force direction corresponds to a direction of an axis of rotation of the clutch arrangement.

6. The clutch arrangement of claim 1, wherein the sealing element is further configured to exert a force on the pressing element such that the pressing element is set by the force to a starting position prior to an actuation of the pressing element.

7. The clutch arrangement of claim 1, wherein the sealing element includes a disk-shaped first portion with a first sealing surface and a disk-shaped second portion with a second sealing surface, wherein the first portion and the second portion are connected to each other through a transitional portion.

8. The clutch arrangement of claim 7, wherein at least one of the first sealing surface and the second sealing surface has along a radial direction a dimension corresponding to at least 5% of a dimension of the transitional portion along the radial direction.

9. The clutch arrangement of claim 7, wherein the first sealing surface and the second sealing surface are offset relative to each other along a radial direction.

10. The clutch arrangement of claim 1, wherein the sealing element is formed in one piece.

11. The clutch arrangement of claim 1, wherein the sealing element is produced by deforming a sheet-like workpiece, by a cutting production method or by a casting production method.

12. The clutch arrangement of claim 1, wherein the sealing element is connected to the housing to be substantially fixed with respect to rotation relative to the housing by at least one of a rivet connection and a plug-in connection, and wherein the sealing element is further configured to produce a connection between the housing and the conveying component such that the housing and the conveying component are substantially fixed with respect to rotation relative to each other.

13. The clutch arrangement of claim 12, wherein the sealing element includes a plurality of leaf spring elements which are connected to the conveying component by positive engagement by at least one of a rivet connection and a plug-in connection to produce the substantially rotationally fixed connection between the conveying component and the housing.

14. The clutch arrangement of claim 7, wherein at least one of the first sealing surface and the second sealing surface has along a radial direction a dimension which is greater than a dimension of the transitional portion along the radial direction.

15. The clutch arrangement of claim 7, wherein the first sealing surface and the second sealing surface are arranged to be offset relative to each other along an axis of rotation of the clutch arrangement.

* * * * *